(12) United States Patent
Schneider et al.

(10) Patent No.: US 12,056,483 B2
(45) Date of Patent: Aug. 6, 2024

(54) MEMORY EFFICIENT SOFTWARE PATCHING FOR UPDATING APPLICATIONS ON COMPUTING DEVICES

(71) Applicant: Google LLC, Mountain View, CA (US)

(72) Inventors: Jakob Schneider, London (GB); Martin David Churchill, London (GB); Alessandro Dovis, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/309,465

(22) PCT Filed: Dec. 30, 2019

(86) PCT No.: PCT/US2019/068973
§ 371 (c)(1),
(2) Date: May 28, 2021

(87) PCT Pub. No.: WO2021/086423
PCT Pub. Date: May 6, 2021

(65) Prior Publication Data
US 2021/0373881 A1    Dec. 2, 2021

(51) Int. Cl.
*G06F 8/658*    (2018.01)
(52) U.S. Cl.
CPC .................... *G06F 8/658* (2018.02)
(58) Field of Classification Search
CPC ........................................................ G06F 8/658
(Continued)

(56) References Cited

U.S. PATENT DOCUMENTS 822,531 A    6/1906    Lowe
8,225,316 B1*    7/2012    Bunnell et al. ......... G06F 8/658
                                                       718/1
(Continued)

FOREIGN PATENT DOCUMENTS

JP    2009099071 A    5/2009
JP    2014178806 A    9/2014
(Continued)

OTHER PUBLICATIONS

Michael E. Porter et al."How Smart, Connected Products Are Transforming Companies" Oct. 2015 Harvard Business Review, pp. 1-19 (Year: 2015).*

(Continued)

*Primary Examiner* — Wei Y Zhen
*Assistant Examiner* — Mohammed N Huda
(74) *Attorney, Agent, or Firm* — Shumaker & Sieffert, P.A.

(57) ABSTRACT

In general, techniques are described by which to perform memory efficient patching for computing devices. A server computing device comprising a memory and a processor may be configured to perform the techniques. The memory may store first assets that form an unpatched application and second assets that form a patched application. The processor may virtualize the first assets to obtain a single first virtual asset and obtain a single second virtual asset that represents the second assets. The processor may obtain, based on differences between the single first virtual asset and the single second virtual asset, a patch identifying how to update the single first virtual asset to obtain the single second virtual asset. The processor may next segment the patch into a plurality of segments and output to a user computing device a single segment from the plurality of segments for individual application by the user computing device.

17 Claims, 7 Drawing Sheets

(58) Field of Classification Search
USPC .......................................................... 717/173
See application file for complete search history.

(56) References Cited

U.S. PATENT DOCUMENTS

| | | | |
|---|---|---|---|
| 8,245,216 B2 | 8/2012 | Felts | |
| 10,725,772 B2 | 7/2020 | Teraoka et al. | |
| 2004/0003266 A1* | 1/2004 | Moshir et al. | G06F 8/65 717/168 |
| 2008/0244595 A1* | 10/2008 | Eilam et al. | G06F 8/10 718/3 |
| 2013/0104119 A1 | 4/2013 | Matsuo et al. | |
| 2018/0365007 A1* | 12/2018 | Bainville et al. | G06F 8/658 |
| 2019/0196803 A1 | 6/2019 | Purushothaman | |

FOREIGN PATENT DOCUMENTS

| | | |
|---|---|---|
| JP | 2016071527 A | 5/2016 |
| JP | 2018018307 A | 2/2018 |
| JP | 2018088034 A | 6/2018 |
| WO | 2010/017326 A1 | 2/2010 |
| WO | 2017188096 A1 | 11/2017 |

OTHER PUBLICATIONS

Response to Communication Pursuant to Rules 161(1) and 162 EPC dated Jun. 18, 2021, from counterpart European Application No. 19839792.9, filed Dec. 15, 2021, 12 pp.
International Search Report and Written Opinion from International Application No. PCT/US2019/068973 dated Jun. 30, 2020, 33 pgs.
Examination Report from counterpart Indian Application No. 202147030071 dated Jun. 17, 2022, 7 pp.
Communication pursuant to Article 94(3) EPC from counterpart European Application No. 19839792.9 dated May 27, 2022, 7 pp.
International Preliminary Report on Patentability from International Application No. PCT/US2019/068973, dated May 12, 2022, 10 pp.
Response to Communication pursuant to Article 94(3) EPC dated May 27, 2022, from counterpart European Application No. 19839792.9 filed Sep. 23, 2022, 26 pp.
Office Action and translation from counterpart Japanese Application No. 2021-549810 dated Dec. 13, 2022, 14 pp.
Response to First Examination Report dated Jun. 17, 2022, from counterpart Indian Application No. 202147030071 filed Nov. 18, 2022, 20 pp.
Communication pursuant to Article 94(3) EPC from counterpart European Application No. 19839792.9 dated Jan. 18, 2023, 5 pp.
Office Action, and translation thereof, from counterpart Korean Application No. 10-2021-7019195 dated Jan. 30, 2023, 14 pp.
Response to Communication pursuant to Article 94(3) EPC dated Jan. 18, 2023, from counterpart European Application No. 19839792.9 filed May 26, 2023, 17 pp.
Notice of Intent to Grant from counterpart Korean Application No. 10-2021-7019195 dated Jul. 11, 2023, 3 pp.
Communication pursuant to Article 94(3) EPC from counterpart European Application No. 19839792.9 dated Sep. 13, 2023, 6 pp.
Office Action, and partial translation thereof, from counterpart Korean Application No. 10-2023-7029583 dated Sep. 19, 2023, 4 pp.
First Office Action and Search Report, and translation thereof, from counterpart Chinese Application No. 201980086076.1 dated Dec. 11, 2023, 12 pp.
Response to Communication pursuant to Article 94(3) EPC dated Sep. 13, 2023, from counterpart European Application No. 19839792.9 filed Jan. 22, 2024, 17 pp.
Communication pursuant to Article 94(3) EPC from counterpart European Application No. 19839792.9 dated May 13, 2024, 6 pp.

* cited by examiner

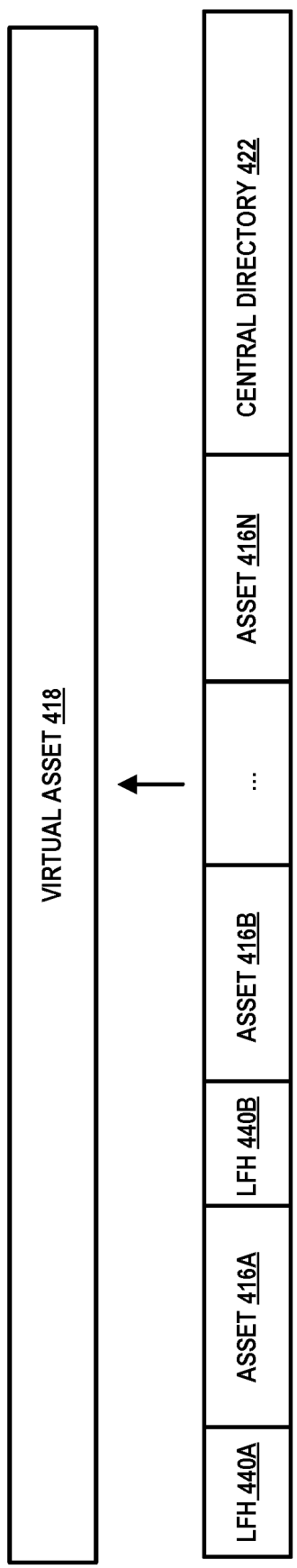

MEMORY EFFICIENT SOFTWARE PATCHING FOR UPDATING APPLICATIONS ON COMPUTING DEVICES

BACKGROUND

Software developers may provide one or more application updates or "patches" to improve the functionality of an application. A patch may include one or more application elements, such as compiled source code (which can be executable code or various abstractions thereof, such as byte code), textures, images, animations, video files, audio files, or any other resource referenced by the executable code. In some distributed environments, a user computing device (e.g., a smartphone) may use an application store application (which may be referred to as an "application store") to obtain and install patches, which are provided by a remote server computing system that supports execution of the application store.

In some examples, when a user selects an existing installed application on a user computing device to update the user computing device may download a so-called "patch," which contains all of the application updates. As such, the term "patch" may refer to a difference between the compiled source code and an updated version of the compiled source code. The user computing device may then make a copy of the compiled source code (which may be a binary executable file) of the installed application and install the patch to the copy of the compiled source code to obtain the updated compiled source code. Such application update processes may require the user computing device to have enough storage space to store the compiled source code of the installed application, the patch (possibly twice when compression is employed as the compressed version of the patch requires decompression that may result in another decompressed version of the patch), and the updated compiled source code.

SUMMARY

In general, techniques of this disclosure may enable a user computing device to more efficiently install a patch (in terms of memory consumption). The user computing device may obtain a patch from a server computing device (which may be referred to as a "server"). The server may generate the patch as a difference between an unpatched application and a patched application, where the patch may define a series of commands that indicate whether to delete, copy, or write data to create the patched application from the unpatched application. The patch may include additional data that is to be written to create the patched application. The server may segment the patch into one or more segments having less than a total number of bytes than the patch in its entirety, where each of the segments are individually installable with respect to the unpatched application. The server may send each segment of the one or more segments individually to the user computing device.

The user computing device may receive the patch in the form of each individual segment of the one or more segments, and then install each individual segment one at a time. After installing each segment, the user computing device may request a next segment of the one or more segments, repeating this process until the entire patch is systematically applied to the unpatched application. The server may also send additional metadata indicating when the user computing device may delete different assets of the unpatched application, thereby potentially enabling the user computing device to consume even less memory during application of the patch as deletion of portions of the unpatched application may free up additional memory (or, in other words, increase available memory).

Accordingly, the described techniques may improve operation of the user computing device as well as a computing system that includes the user computing device and the server. By receiving and installing the patch in segments, the described techniques may reduce the amount of storage required on the user computing device to install a patch, and improve the user computing device performance (as patching may be drawn out over time and thereby improve processing throughput during application of the patch, reduce bandwidth utilization, including memory bandwidth utilization). In addition, permitting deletion of portions of the unpatched application during application of the segments of the patch to the unpatched application may further reduce memory utilization, thereby improving the performance of the user computing device.

In one example, various aspects of the techniques are directed to a method comprising: virtualizing, by one or more processors, a first plurality of assets that form an unpatched application to obtain a single first virtual asset; obtaining, by the one or more processors, a single second virtual asset that represents a second plurality of assets that form a patched application; obtaining, by the one or more processors, and based on differences between the single first virtual asset and the single second virtual asset, a patch identifying how to update the first virtual asset to obtain the single second virtual asset and including portions of the second virtual asset used to update the single first virtual asset; segmenting, by the one or more processors, the patch into a plurality of segments; and outputting, by the one or more processors, and to a user computing device, a single segment from the plurality of segments for individual installation by a user computing device to the unpatched application.

In another example, various aspects of the techniques are directed to a server computing device comprising: a memory configured to store a first plurality of assets that form an unpatched application and a second plurality of assets that form a patched application; and one or more processors configured to: virtualize the first plurality of assets to obtain a single first virtual asset; obtain a single second virtual asset that represents a second plurality of assets that form a patched application; obtain, based on differences between the single first virtual asset and the single second virtual asset, a patch identifying how to update the first virtual asset to obtain the single second virtual asset and including portions of the second virtual asset used to update the single first virtual asset; segment the patch into a plurality of segments; and output, to the user computing device, a single segment from the plurality of segments for individual installation by a user computing device to the unpatched application.

In another example, various aspects of the techniques are directed to a non-transitory computer-readable storage medium having stored thereon instructions that, when executed, cause one or more processors to: virtualize a first plurality of assets that form an unpatched application to obtain a single first virtual asset; obtain a single second virtual asset that represents a second plurality of assets that form a patched application; obtain, based on differences between the single first virtual asset and the single second virtual asset, a patch identifying how to update the first virtual asset to obtain the single second virtual asset and portions of the second virtual asset used to update the single first virtual asset; segment the patch into a plurality of segments; and output, to the user computing device, a single segment from the plurality of segments for individual installation by a user computing device to the unpatched application.

In another example, various aspects of the techniques are directed to a method comprising: obtaining, by one or more processors of a user computing device, and from a server computing device, a single segment of a plurality of segments, the plurality of segments representative of a patch identifying how to update a first virtualized asset representative of an unpatched application to obtain a single second virtualized asset representative of a patched application and including portions of the second virtualized asset used to update the single first virtualized asset; virtualizing, by the one or more processors, a first plurality of assets that form the unpatched application installed at the user computing device to obtain the single first virtual asset; and applying, by the one or more processors, the single segment to the single first virtual asset to construct at least a portion of a single second virtual asset, the single second virtual asset including a second plurality of assets that form a patched application.

In another example, various aspects of the techniques are directed to a user computing device comprising: a memory configured to store a single segment of a plurality of segments provided by a server computing device, the plurality of segments representative of a patch identifying how to update a single first virtual asset representative of an unpatched application to obtain a single second virtual asset representative of a patched application and including portions of the second virtualized asset used to update the single first virtualized asset; and one or more processors configured to: virtualize a first plurality of assets that form the unpatched application installed at the user computing device to obtain the single first virtual asset; and apply the single segment to the single first virtual asset to construct at least a portion of a single second virtual asset, the single second virtual asset including a second plurality of assets that form a patched application.

In another example, various aspects of the techniques are directed to a non-transitory computer-readable storage medium having stored thereon instructions that, when executed, cause one or more processors of a user computing device to: obtain, from a server computing device, a single segment of a plurality of segments, the plurality of segments representative of a patch identifying how to update a first virtualized asset representative of an unpatched application to obtain a single second virtualized asset representative of a patched application and including portions of the second virtualized asset used to update the single first virtualized asset; virtualize a first plurality of assets that form the unpatched application installed at the user computing device to obtain the single first virtual asset; and apply the single segment to the single first virtual asset to construct at least a portion of a single second virtual asset, the single second virtual asset including a second plurality of assets that form a patched application.

In another example, various aspects of the techniques are directed to a method comprising: virtualizing, by one or more processors, a first plurality of assets that form an unpatched application to obtain a single first virtual asset; virtualizing, by the one or more processors, a second plurality of assets that form a patched application to obtain a single second virtual asset; obtaining, by the one or more processors, and based on differences between the single first virtual asset and the single second virtual asset, a patch identifying how to update the first virtual asset to obtain the single second virtual asset and including portions of the second virtual asset used to update the single first virtual asset; generating, by the one or more processors, and while obtaining the patch, metadata indicating when a user computing device is able to delete portions of the single first virtual asset; and outputting, by the one or more processors, and to the user computing device, the patch and the metadata.

In another example, various aspects of the techniques are directed to a server computing device comprising: a memory configured to store a first plurality of assets that form an unpatched application and a second plurality of assets that form a patched application; and one or more processors configured to: virtualize the first plurality of assets to obtain a single first virtual asset; virtualize the second plurality of assets to obtain a single second virtual asset; obtain, based on differences between the single first virtual asset and the single second virtual asset, a patch identifying how to update the first virtual asset to obtain the single second virtual asset and including portions of the second virtual asset used to update the single first virtual asset; generate, while obtaining the patch, metadata indicating when a user computing device is able to delete portions of the single first virtual asset; and output, to the user computing device, the patch and the metadata.

In another example, various aspects of the techniques are directed to a non-transitory computer-readable storage medium having stored thereon instructions that, when executed, cause one or more processors to: virtualize a first plurality of assets that form an unpatched application to obtain a single first virtual asset; virtualize a plurality of assets that form a patched application to obtain a single second virtual asset; obtain, based on differences between the single first virtual asset and the single second virtual asset, a patch identifying how to update the first virtual asset to obtain the single second virtual asset and portions of the second virtual asset used to update the single first virtual asset; generate, while obtaining the patch, metadata indicating when a user computing device is able to delete portions of the single first virtual asset; and output, to the user computing device, the patch and the metadata.

In another example, various aspects of the techniques are directed to a method comprising: obtaining, by one or more processors of a user computing device, and from a server computing device, a patch identifying how to update a first virtualized asset representative of an unpatched application to obtain a single second virtualized asset representative of a patched application and including portions of the second virtualized asset used to update the single first virtualized asset; obtaining, by the one or more processors, and from the server computing device, metadata indicating when the user computing device is able to delete a portion of the single first virtual asset; virtualizing, by the one or more processors, a first plurality of assets that form the unpatched application installed at the user computing device to obtain the single first virtual asset; and applying, by the one or more processors, the patch to the single first virtual asset to construct the single second virtual asset, the single second virtual asset including a second plurality of assets that form a patched application; and deleting, during application of the patch, and based on the metadata, the portion of the single first virtual asset.

In another example, various aspects of the techniques are directed to a user computing device comprising: a memory configured to store a patch identifying how to update a single first virtual asset representative of an unpatched application to obtain a single second virtual asset representative of a patched application and including portions of the second virtualized asset used to update the single first virtualized asset; and one or more processors configured to: apply the patch to the single first virtual asset to construct the single second virtual asset, the single second virtual asset including a second plurality of assets that form a patched application; and delete, during application of the patch, and based on the metadata, the portion of the single first virtual asset.

In another example, various aspects of the techniques are directed to a non-transitory computer-readable storage medium having stored thereon instructions that, when executed, cause one or more processors of a user computing device to: obtain, from a server computing device, a patch identifying how to update a first virtualized asset representative of an unpatched application to obtain a single second virtualized asset representative of a patched application and including portions of the second virtualized asset used to update the single first virtualized asset; virtualize a first plurality of assets that form the unpatched application installed at the user computing device to obtain the single first virtual asset; and apply the patch to the single first virtual asset to construct the single second virtual asset, the single second virtual asset including a second plurality of assets that form a patched application; and delete, during application of the patch, and based on the metadata, the portion of the single first virtual asset.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is a block diagram illustrating an example virtual asset generated by the system of FIG. 1 in accordance with various aspects of the techniques described in this disclosure.

DETAILED DESCRIPTION

Figure 1:
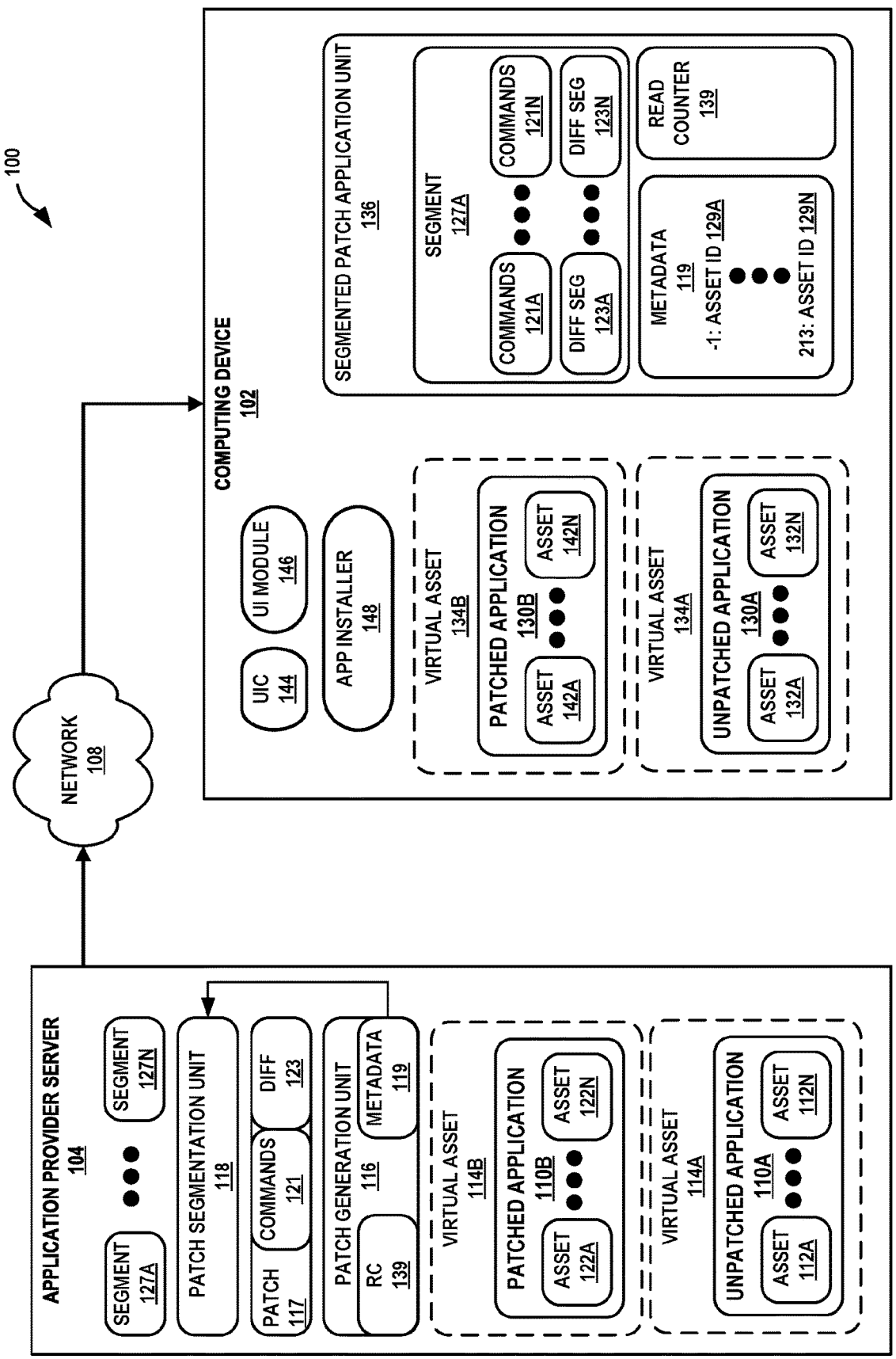
FIG. 1 is a conceptual diagram illustrating an example computing system configured to perform various aspects of the segmented application update techniques described in this disclosure.

FIG. 1 is a conceptual diagram illustrating an example computing system in which a computing device may perform various aspects of the memory efficient patching techniques described in this disclosure. As shown in FIG. 1, computing system 100 may include a computing device 102 and an application provider server 104. Computing device 102 may represent any type of device capable of executing applications, such as application 130A, and supports application of software patches (which may also be referred to as "patches") to such applications. For example, computing device 102 may represent a cellular phone or handset (including a so-called "smart phone"), a streaming media device (including those that are inserted directly into a port of a television), a dedicated gaming system, a portable gaming system, a streaming gaming system, a television (including so-called "smart televisions"), a wireless speaker, a smart hub, a watch (including a so-called "smart watch"), smart glasses, a smart ring or other wearable device, an extended reality device (such as a virtual reality—VR—device, an augmented reality—AR—device, etc.), a digital video disc (DVD) player, a Blueray™ player, a laptop computer, a desktop computer, a workstation, or any other device capable of executing applications.

As shown in the example of FIG. 1, computing device 102 includes a user interface component (UIC) 144, UI module 146, an application installer 148, and, prior to receiving a patch for application 130A, application 130A. UIC 144 of computing device 102 may function as an input and/or output device for computing device 102. UIC 144 may be implemented using various technologies. For instance, UIC 144 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UI module 146 may manage user interactions with UIC 144 and other components of computing device 102. UIC 144 and UI module 146 may receive one or more indications of input (e.g., voice input, gesture input, etc.) from a user as the user interacts with a user interface presented by UIC 144. Unpatched application 130A may represent an application that is currently installed on computing device 102. While the example of FIG. 1 illustrates a single application 130A that is currently installed on computing device 102, it should be understood that any number of applications may be installed on computing device 102, and that computing device 102 is not necessarily limited to only having a single application installed on computing device 102.

Application installer 148 may represent a module or unit configured to install unpatched application 130A on computing device 102. Application installer 148 may also present an interface provided by application provider server 104 with which the user of computing device 102 may interact via UIC 144 and/or UI module 146 to download unpatched application 130A. Application installer 148 may communicate with application provider server 104 to arrange for the download of unpatched application 130A, where application installer 148 may, upon receiving unpatched application 130A, perform various operations to install unpatched application 130A, such as decompressing (which may be referred to as "unzipping") unpatched application 130A, memory management, etc.

UIC 144, UI module 146, application installer 148, and unpatched application 130A may perform operations described herein using hardware, or a combination of hardware and software and/or firmware residing in and/or executing at computing device 102. Computing device 102 may execute UI module 146, application installer 148, and unpatched application 130A with multiple processors or multiple devices. In some cases, computing device 102 may execute UI module 146 and/or application installer 148 as virtual machines executing on underlying hardware. UI module 146 and/or application installer 148 may also execute as one or more services of an operating system or computing platform, or as one or more executable programs at an application layer of a computing platform.

Application 130A may include one or more assets 132A-132N ("assets 132"). Assets 132 may refer to resources (e.g., images, textures, files, scripts, video data, audio data, etc.) that are accessed during execution of the application, and the like. It should be understood that the assets 132 of unpatched application 130A may not be accessible by other applications installed on computing device 102 without explicit permission of unpatched application 130A. Thus, the assets 132 may not include shared libraries or other data that is accessed by multiple different applications. Likewise, unpatched application 130A may not be able to access assets of a different application. In some examples, computing device 102 may execute unpatched application 130A in a sandboxed environment, which isolates assets 132 of unpatched application 130A from other applications.

As further shown in the example of FIG. 1, computing device 102 may communicate with application provider server 104 via a network 108, where network 108 may represent any public or private communications network, for instance, cellular, Wi-Fi, and/or other types of networks, for transmitting data between computing systems, servers, and computing devices. Network 108 may include one or more network hubs, network switches, network routers, or any other network equipment, that are operatively inter-coupled thereby providing for the exchange of information between application provider server 104 and computing device 102. Computing device 102 and application provider server 104 may transmit and receive data across network 108 using any suitable communication techniques. Computing device 102 and application provider server 104 may each be operatively coupled to network 108 using respective network links. The links coupling computing device 102 and application provider server 104 to network 108 may be Ethernet or other types of network connections and such connections may be wireless and/or wired connections.

Application provider server 104 may represent any suitable remote computing system, such as one or more desktop computers, laptop computers, mainframes, servers, cloud computing systems, etc. capable of sending and receiving information both to and from a network, such as network 108. Application provider server 104 hosts (or at least provides access to) applications and presents the above noted interface (such as an application store, which is not shown in the example of FIG. 1 for ease of illustration purposes) by which computing device 102 may access applications for download to computing device 102 via network 108.

Application provider server 104 may perform operations described using hardware or a mixture of hardware, software, and firmware residing in and/or executing at application provider server 104. Application provider server 104 may perform various operations described herein with multiple processors or multiple devices. Application provider server 104 may also execute various modules or units described in more detail below as virtual machines executing on underlying hardware. In some examples, application provider server 104 may execute the interface by which to access application as one or more services of an operating system or computing platform, or as one or more executable programs at an application layer of a computing platform.

Application provider server 104 may include a patch generation unit 116, which may generate a patch 117 for unpatched application 110A. Patch generation unit 116 may execute various patching algorithms to generate patch 117, such as generic difference (diff) ("Gdiff"), bsdiff, and the like, which may generate and potentially compress (along with other operations performed with respect to) the underlying binary differences between unpatched application 110A and patched application 110B to form patch 117.

That is, each of unpatched application 110A and patched application 110B may represent compiled source code (or, in other words, executable binary code or some derivation thereof, such as byte code) that configures or otherwise programs a processor (or other hardware) to perform various operations. Patch generation unit 116 may represent a unit configured to determine a difference between unpatched application 110A and patched application 110B, and output a list of commands 121 for updating unpatched application 110A to patched application 110B and difference 123 ("diff 123") that both form patch 117. Commands 121 may identify one or more delete operations, one or more copy operations, and/or one or more of write operations (or any combinations thereof) instructing computing device 102 how to manipulate unpatched application 130A to produce patched application 130B (where unpatched application 130A may represent a different instance of unpatched application 110A and patched application 130B may represent a different instance of patched application 110B).

Upon generating patch 117, application provider server 104 may interface with app installer 148 executed by computing device 102 to indicate that patch 117 is available for download. App installer 148 may, in some instances, produce, responsive to the indication that patch 117 is available, an alert or other indication that patch 117 for unpatched application 130A is available for download and installation. The user of computing device 102 may, in this instance, interface with app installer 148 via UIC 144 and/or UI module 146 to initiate download and install of patch 117. In other instances, app installer 148 may automatically download and install patch 117 responsive to the indication that patch 117 is available. The user may specify that automatic patching is enabled in system settings or per application, identifying a time and/or day during which automated patching may occur.

Regardless, computing device 102 may obtain patch 117 from application provider server 104 and install patch 117 to unpatched application 130A to produce patched application 130B. Patching in this manner may occur to allow developers of application 110A/130A to add additional functionality, fix software errors (so-called "software bugs"), prevent malicious attacks, update graphical capabilities or other functionality, and the like without having to download an entirely new application (which can be large and therefore consume significant bandwidth—both bandwidth of network 108 and memory and/or storage bandwidth of computing device 102, processor cycles of computing device 102, etc.).

While patching may generally improve operation of application 110A/130A and thereby improve operation of computing device 102, patch 117 may still, in certain instances, be large (on the order of multiple gigabytes—e.g., several to tens of gigabytes, multiple megabytes—e.g., hundreds of megabytes, etc.). For example, developers may update assets 112A-112N ("assets 112") of unpatched application (which refer to an instance of assets 132) to improve graphical fidelity, update textures, add or remove video data and/or audio data, or perform other example updates that improve a user experience of unpatched application 110A. As such, patched application 110B may include a different set of assets 122A-122N ("assets 122") in which one or more of assets 122 may differ with assets 112 (although one or more of assets 122 may, in some instances, be the same as assets 112). In this example, patch generation unit 116 may not determine there is much if any difference between the compiled source code of unpatched application 110A and patched application 110B, but only note that there are differences between assets 112 and 122, resulting in a diff 123 that mainly includes assets 122 that include assets that replace or that are in addition to assets of assets 112.

In some instances, due to the patching process, computing device 102 may have insufficient storage space (e.g., memory and/or storage space) to store unpatched application 130A, patched application 130B, and patch 117. In other words, to apply patch 117, computing device 102 may download patch 117 in its entirety and reserve available space in memory and/or storage for patched application 130B, all while storing unpatched application 130A in its entirety. Computing device 102 may then iterate through commands 121 of patch 117, perform one or more of the above operations to construct patched application 130B from unpatched application 130A and diff 123. While various aspects of the techniques are described with respect to assets, the techniques may be implemented with respect to compiled source code or other types of files, resources, and/or data not described in detail in this disclosure.

To illustrate how memory and/or storage limited computing devices may be impacted by this process, assume computing device 102 only has 1.4 gigabytes (GB) of memory available and is to install patch 117 that is of a size of 400 megabytes (MB) with respect to unpatched application 130A that is of a size of 1 GB resulting in patched application 130B of a size of 1.2 GB. In this example illustration, computing device 102 may download patch 117 consuming 400 MB of the 1.4 GB of available memory resulting in only 1 GB of available memory. When computing device 102 attempts to reserve the 1.2 GB of memory for patched application 130B, a memory manager of computing device 102 (which is not shown for ease of illustration purposes) may deny the request due to insufficient available memory (as 1.2 GB is larger than the 1 GB of available memory). As such, computing device 102 may not apply patch 117 to unpatched application 130A.

The inability to apply patch 117 may result in computing device 102 being unable to execute patched application 130B, and thereby potentially deprive the user of added functionality, updated graphics, audio experiences, video experiences, etc., expose computing device 102 to security vulnerabilities, and the like. As computing devices, such as computing device 102, continue to evolve, such computing devices are being employed for increasingly larger amounts of time such that shortages of available memory can often become a barrier to proper patch application (such as in the case of smart phones that store large amounts of personal information in the form of videos, text—including text messages, emails, etc., images—such as photos, and the like).

In accordance with various aspects of the techniques set forth in this disclosure, application provider server 104 may segment patch 117 into a number of patch segments 127A-127N ("segments 127") and provide segments 127 to computing device 102 (which may represent one example of a "user computing device") to thereby potentially enable computing device 102 to more efficiently install a patch (in terms of memory consumption). Computing device 102 may obtain patch 117 from application provider server 104 (which may be referred to as a "server"). Application provider server 104 may segment patch 117 into one or more segments 127 having less than a total number of bytes than patch 117 in its entirety, where each of segments 127 are individually installable with respect to unpatched application 110A/130A. Application provider server 104 may send each segment of the one or more segments 127 individually to computing device 102.

Computing device 102 may receive patch 117 in the form of each individual segment of the one or more segments 127, and then install each individual segment one at a time (in some instances, although in other instances two or more segments 127 may be required to install some larger portions of or entire ones of assets 122A in diff 123). After installing each segment, computing device 102 may request a next segment of segments 127, repeating this process until entire patch 117 is systematically applied to unpatched application 130A. Application provider server 104 may also send additional metadata 119 indicating when computing device 102 may delete different assets 132 of unpatched application 130A, thereby potentially enabling computing device 102 to consume even less memory during application of patch 117 (in the form of iterative application of segments 127) as deletion of portions of unpatched application 130A may free up additional memory (or, in other words, increase available memory).

In operation, a software developer may interface with application provider server 104 to upload patched application 110B, and request that application provider server 104 produce patch 117. Responsive to the request that application provider server 104 produce patch 117, application provider server 104 may invoke patch generation unit 116, which may execute one or more of the patching algorithms mentioned above to produce patch 117 based on a difference between unpatched application 110A and patched application 110B.

As the patching algorithms may perform a diff on a file-by-file basis and not across files, patch generation unit 116 may virtualize unpatched application 110A, including all of assets 112, as a single virtual asset 114. Patch generation unit 116 may execute a virtualization algorithm that presents a multi-tiered memory and/or storage file hierarchy having folders and subfolders in which unpatched application 110A, including assets 112, is stored as a single virtual asset 114A. Patch generation unit 116 may also virtualize patched application 110B, including assets 122, to present a multi-tiered memory and/or storage file hierarchy having folders and subfolders in which unpatched application 110B, including assets 122, is stored as a single virtual asset 114B. Patch generation unit 116 may then execute the patching algorithm with respect to single virtual asset 114B to produce commands 121 and diff 123 of patch 117, where commands 121 identify operations to perform with respect to unpatched application 110A to produce, based in part on diff 123, patched application 110B.

Although described as performing the virtualization, patch generation unit 116 may not perform the virtualization in instances where server 104 may receive the assets as an archive (which is another way to refer to a virtualized asset). Alternatively, server 104 may virtualize assets 122 upon upload by the developer and thereafter store the virtualized asset as virtual asset 114B.

Patch generation unit 116 may output patch 117, whereupon application provider server 104 may interface, in the manner described above, to alert computing device 102 of patch 117. Computing device 102 may then request patch 117 from application provider server 104 via the above noted interface, invoking app installer 148 to download and install patch 117. Responsive to the request for patch 117, application provider server 104 may invoke a patch segmentation unit 118. Patch segmentation unit 118 may represent a module or unit configured to segment patch 117 into one or more patch segments 127. Patch segmentation unit 118 may create each of segments 127 such that some subset of commands 121 and corresponding portion of diff 123 are completely contained within each of segments 127.

In some instances, patch segmentation unit 118 may not be able to store all of a given portion of diff 123 referenced by a command of commands 121 included in one of segment 127, resulting in some amount of fragmentation of the portion of diff 123 across two or more segments 127. In these instances, patch segmentation unit 118 may spread the portion of diff 123 across two or more segments 127, which may result in computing device 102 caching certain segments of segments 127 until the entire portion of diff 123 is available for storage to patched application 130B. However, in other instances, patch segmentation unit 118 may generate segments 127 such that each of segments 127 is individually installable by computing device 102.

Assuming, for ease of explanation, that each of segments 127 are individually installable by computing device 102, application provider server 104 may output each of segments 127 individually to computing device 102 (e.g., one at a time). Computing device 102 may receive a segment, such as segment 127A as shown in the example of FIG. 1, including a subset of commands 121 (e.g., commands 121A-121N, which may be referred to as "command subset 121") and a subset of diff segments 123 (e.g., "diff segs 123A-123N," which may be referred to as "diff segs 123") referenced by command subsets 121.

Responsive to receiving segment 127A, computing device 102 may invoke segmented patch application unit 136, which represents a unit configured to apply patch 117 in an iterative manner as a sequence of segments 127. In order to apply segment 127A, segmented patch application unit 136 may first virtualize unpatched application 130A in a similar, if not substantially similar, manner as that described above with respect to patch generation unit 116 to create virtual asset 134A.

Segmented patch application unit 136 may next execute commands 121 to delete assets 142 from a virtual asset 134B representative of patched application 130B, copy from virtual asset 134A to virtual asset 134B, and write one or more portions (in the form of diff segments 123) of a virtual asset representative of patched application 130B to virtual asset 134B. That is, commands 121 may indicate how to update single virtual asset 134A to obtain single virtual asset 134B As such, segmented patch application unit 136 may apply single segment 127A to virtual asset 134A to populate or, in other words, construct virtual asset 134B.

In addition or as an alternative, patch generation unit 116 may generate, while obtaining patch 117, metadata 119 indicating when computing device 102 is able to delete portions of virtual asset 134A. Patch generation unit 116 may generate metadata 119 as a series of one or more instructions 129A-129N, each of which includes a read index followed by an indication identifying an associated one of assets 132 or other portion of unpatched application 130A. In FIG. 1, instructions 129 include two examples in which a read index of −1 and 213 is followed by an asset name, reference, or other identifier (labeled as "ASSET" in the example of FIG. 1).

Patch generation unit 116 may include a read counter 139 ("RC 139") that patch generation unit 116 increments after each read of unpatched application 110A. When a read of one of assets 112 occurs, patch generation unit 116 may update metadata 119 to indicate that a read index for the one of assets 112 is equal to read counter 139, specifying the indication identifying one of the assets 112 after the read index. Patch generation unit 116 may systematically generate metadata 119 in this manner to indicate when each of assets 112 or other portions of unpatched application 110A/130A as represented by virtual assets 114A/134A may be deleted (or, in other words, marked as available memory and/or storage). Patch generation unit 116 may specify this read index and corresponding asset identifier as instructions 129 in metadata 119.

Patch generation unit 116 may provide metadata 119 to patch segmentation unit 118, which may append metadata 119 to a first segment sent to computing device 102 (which is assumed for purposes of illustration to be segment 127A). Application provider server 104 may send metadata 119 to computing device 102 with segment 127A.

Computing device 102 may invoke, as noted above, segmented patch application unit 136 to process segment 127A, whereupon segmented patch application unit 136 may parse metadata 119 from segment 127A. Segmented patch application unit 136 may then maintain read counter 139 in the same way as that described above with respect to patch generation unit 116. Whenever a read index in metadata 119 matches read counter 139, segmented patch application unit 136 may delete the one of assets 132 identified by the corresponding asset identifier (which may more generally refer to any portion of unpatched application 130A).

In some examples, a read index may have a negative value (such as negative one (−1)), which indicates that the corresponding one of assets 132 can be deleted without reference to read counter 139 (e.g., because it was deprecated, replaced, or otherwise removed entirely). In these examples, segmented patch application unit 136 may initially process metadata 119 to proactively delete all of assets 132 identified by the application identifier with a corresponding read index having a negative value.

Segmented patch application unit 136 may continue in this manner to receive segments 127 iteratively and applying each of segments 127 individually prior to applying a successive one of segments 127. In some examples, segmented patch application unit 136 may interface with application provider server 104 to provide a confirmation that a previous one of segments 127 was successfully applied, and only after receiving the confirmation may application provider server 104 transmit a next one of segments 127 to potentially ensure that available memory resources are conserved such that application of patch 117 may complete successfully.

Likewise, segmented patch application unit 136 may continue to maintain read counter 139 as segments 127 are iteratively applied to virtual asset 134A. Segmented patch application unit 136 may continue to reference read counter 139 relative to instructions 129 of metadata 119, and whenever read counter 139 matches a read index of one of instructions 129, delete a corresponding one of assets 132.

Accordingly, the described techniques may improve operation of computing device 102 as well as a computing system that includes the computing device 102 and application provider server 104. By receiving and installing patch 117 in segments 127, the described techniques may reduce the amount of storage required on computing device 102 to install patch 127, and improve computing device 102 performance (as patching may be drawn out over time and thereby improve processing throughput during application of the patch and reduce bandwidth utilization, including memory bandwidth utilization). In addition, permitting deletion of portions of unpatched application 130A during application of segments 127 of patch 117 to unpatched application 130A may further reduce memory utilization, thereby improving the performance of computing device 102.

Figure 2:
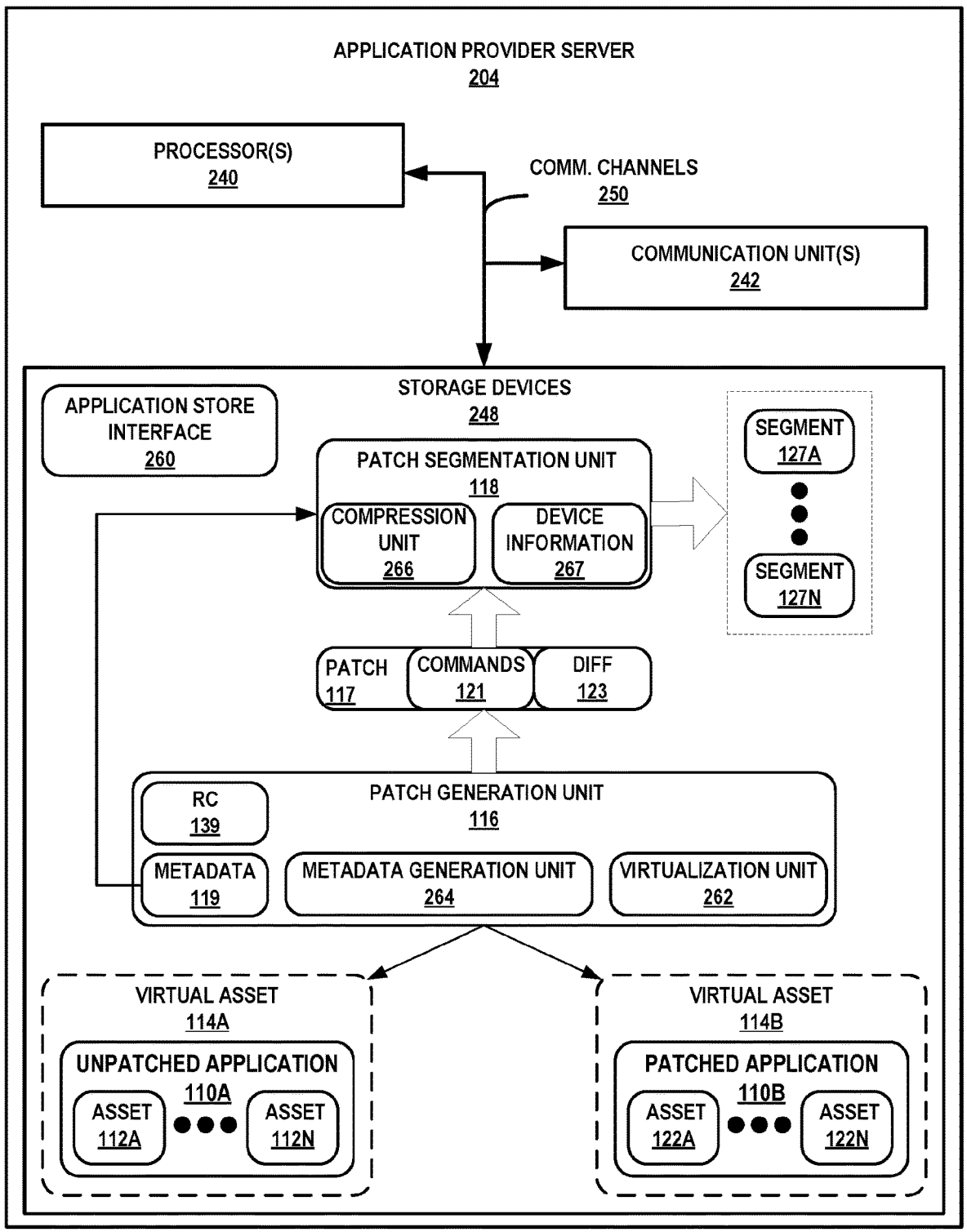
FIG. 2 is a block diagram illustrating an example application provider server configured to perform various aspects of the efficient patching techniques described in this disclosure.

FIG. 2 is a block diagram illustrating an example application provider server configured to perform various aspects of the efficient patching techniques described in this disclosure. FIG. 2 illustrates only one particular example of application provider server 204, and many other examples of application provider server 204 may be used in other instances. In other examples, application provider servers may include a subset of the components included in example application provider server 104 or may include additional components not shown in FIG. 2. For example, application provider server 204 may comprise a cluster of servers, and each of the servers comprising the cluster of servers making up application provider server 204 may include all, or some, of the components described herein in FIG. 2, to perform the techniques disclosed herein. As such, application provider server 204 represents one example of application provider server 104.

As shown in the example of FIG. 2, application provider server 204 includes one or more processors 240, one or more communication units 242, and one or more storage devices 248. Processors 240 may implement functionality and/or execute instructions associated with application provider server 204. Examples of processors 240 include application processors, display controllers, auxiliary processors, one or more sensor hubs, and any other hardware configured to function as a processor, a processing unit, or a processing device. Patch generation unit 116, patch segmentation unit 118, and an application store interface 260 may be executed by processors 236 to perform various actions, operations, or functions of application provider server 204. For example, processors 240 may retrieve and execute instructions stored by storage devices 248 (and represented by patch generation unit 116, patch segmentation unit 118, and application store interface 260) that cause processors 240 to perform the operations described herein with respect to patch generation unit 116, patch segmentation unit 118, and application store interface 260. The instructions, when executed by processors 240, may cause application provider server 204 to store information within storage devices 248.

Communication unit 242 may represent a unit configured to communicate with external devices (e.g., computing device 102) via one or more wired and/or wireless networks (e.g., network 108) by transmitting and/or receiving network signals via the one or more networks. Examples of communication units 242 include a network interface card (e.g. such as an Ethernet card), an optical transceiver, a radio frequency transceiver, a global positioning satellite (GPS) receiver, a cellular transceiver, or any other type of device that can send and/or receive data. Other examples of communication units 242 may include short wave radios, cellular data radios, wireless network radios, as well as universal serial bus (USB) controllers.

Storage devices 248 may represent one or more memories and/or storage device configured to store information for processing during operation of application provider server 204. In some examples, storage devices 248 may represent a temporary memory, meaning that a primary purpose of storage devices 248 is not long-term storage. Storage devices 248 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 248 may, in some examples, also include one or more computer-readable storage mediums. Storage devices 248 may include one or more non-transitory computer-readable storage mediums. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with patch generation unit 116, patch segmentation unit 118, and/or application store interface 260. Storage devices 248 may include a memory configured to store data or other information associated with patch generation unit 116, patch segmentation unit 118, and/or application store interface 260.

Application provider server 204 may initially receive via application store interface 260 (which may represent an interface presented to software developers, users, and other entities for interacting with an underlying electronic marketplace for downloading or otherwise obtaining applications, such as application 110A) patched application 110B from a software developer responsible for supporting application 110A. Application provider server 204 may, responsive to receiving patched application 110B, invoke patch generation unit 116 to generate a patch 117 representative of a difference between unpatched application 110A and patched application 110B.

To generate patch 117, patch generation unit 116 may first invoke virtualization unit 262. Virtualization unit 262 may represent a unit configured to virtualize a number of assets, such as each of assets 112 and 122, that form an application, such as respective unpatched application 110A and patched application 110B. Virtualization unit 262 may, as one example, extend a Java class referred to as "RandomAccessFile" so that a single RandomAccessFile object may include multiple files or other assets, thereby virtualizing assets to appear as a single virtual asset. In other words, virtualization unit 262 may append a number of different assets to one another and encapsulate the appended assets in a RandomAccessFile object with extended functions to handle how the appended assets are accessed and stored to an underlying filesystem. Virtualization unit 262 may, in this way, virtualize unpatched application 110A to obtain virtual asset 114A and patched application 110B to obtain virtual asset 114B.

Next, patch generation unit 116 may apply one or more of the above noted patching algorithms with respect to virtual asset 114A and virtual asset 114B to obtain commands 121 and diff 123. During application of the patching algorithm, patch generation unit 116 may invoke metadata generation unit 264, which may represent a unit configured to generate metadata 119 that indicates when assets 112 of unpatched application 110A may be deleted during application of patch 117 to other instances of unpatched application (such as unpatched application 130A of computing device 102 shown in the example of FIG. 1).

Metadata generation unit 264 may increment read counter 139 to reflect each memory/storage device read operation performed with respect to assets 112. Whenever a last read of an asset occurs, metadata generation unit 264 may specify a current value of read counter 139 as a read index along with the asset identifier, thereby indicating that the identified asset may be deleted when a corresponding read counter 139 maintained at computing device 102 equals the read index. Metadata generation unit 264 may also indicate in metadata 119 that an asset may be immediately deleted (because the asset is not read throughout the entirety of the generation of patch 117) by specifying a negative value (such as negative one) for the read index along with the application identifier.

After generating patch 117, application provider server 204 may invoke application store interface 260 to interface with computing device 102, via communication units 242, to indicate that patch 117 is available for download. Application provider server 204 may thereafter receive a request for patch 117 and possibly, via this request or a separate communication, device information 267. Device information 267 may include one or more types of information about computing device 102, but may also specify an amount of memory that is available (which may be referred to as "available memory"). Application provider server 204 may next invoke patch segmentation unit 118, passing device information 267 to patch segmentation unit 118.

Patch segmentation unit 118 may segment patch 117 into segments 127, possibly based on device information 267. That is, should device information 267 indicate that available memory is below a threshold, patch segmentation unit 118 may select a smaller size for each of segments 127 than would otherwise be selected (or pre-defined) when device information 267 indicates that available memory is above the threshold. In some instances however, patch segmentation unit 118 may segment patch 117 into segments 127 regardless of device information 267, where the size of each of segments 127 may be the same, pre-defined for each segment but not necessarily the same, or adapted based on various criteria (such as ability to be individually installed).

Patch segmentation unit 118 may, upon generating segments 127, invoke compression unit 266 to compress each of segments 127 independent from one another (such that each of segments 127 may be individually decompressed). Compression unit 266 may represent a unit configured to apply one or more compression algorithms with respect to diff segments 127 and possibly commands 121. When compressing segments 127, compression unit 266 may invoke different compression algorithms depending on a type of content the various portions of segments 127 represent. That is, segments 127 may include entire ones of assets 122, which again may represent images, videos, textures, text, audio, etc., and compression unit 266 may apply an image compression algorithm for images, a video compression algorithm for videos, a texture compression algorithm for textures, an audio compression algorithm for audio, etc. In this respect, segments 127 may represent a compressed portion or segment of patch 117.

Application provider server 204 may then iteratively output (possibly one at a time) segments 127 to computing device 102 (where one segment may include metadata 119, which patch generation unit 116 to pass to patch segmentation unit 118 along with patch 117). Application provider server 204 may only output a successive segment in response to a confirmation from computing device 102 indicating that the current segment was successfully applied to virtual asset 134A representative of unpatched application 130A. Application provider server 204 may iterate in this manner, serving a single segment of segments 127 at a time until each of segments 127 has been successfully applied to virtual asset 134A in order to generate virtual asset 134B.

Figure 3:
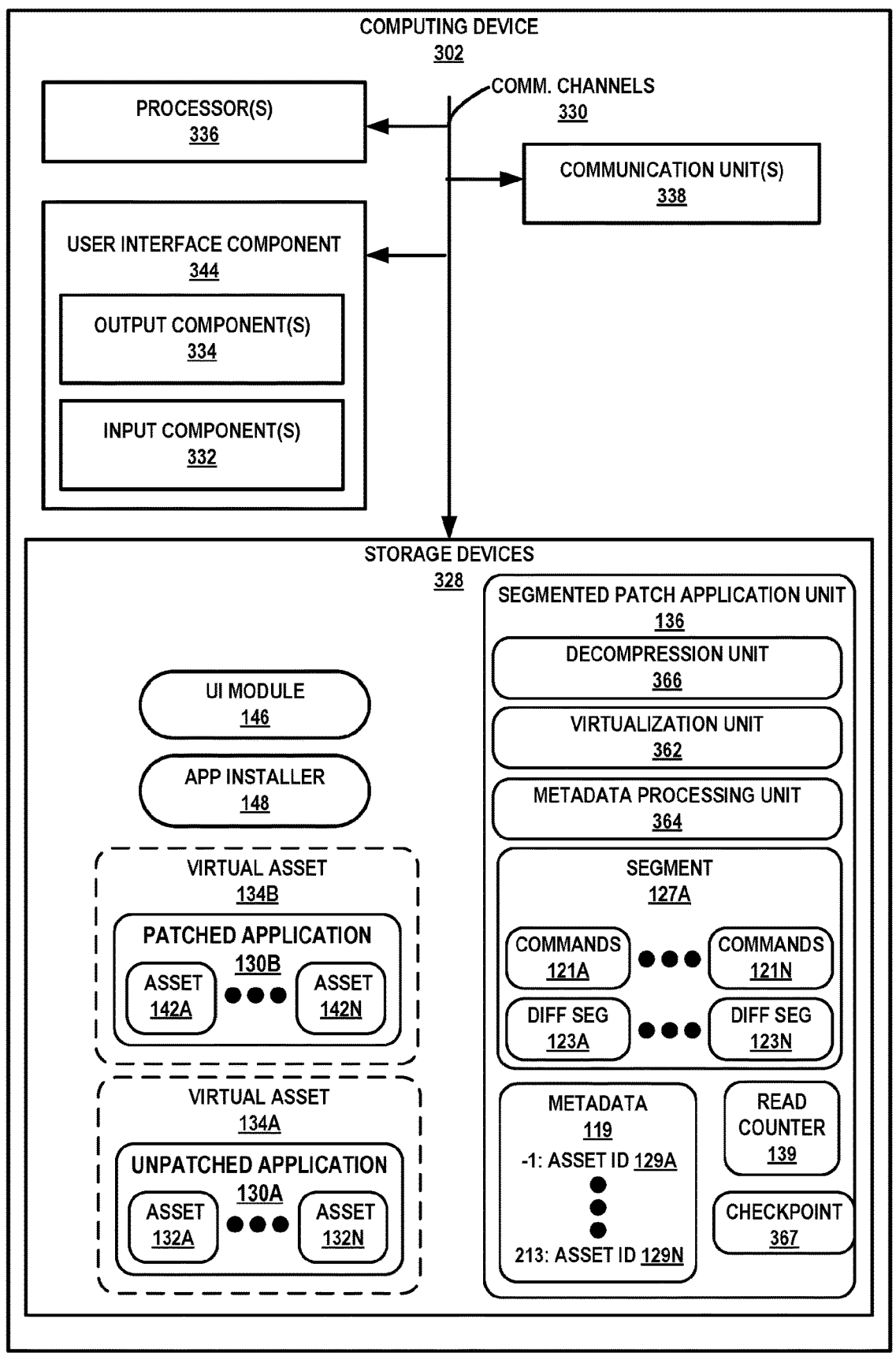
FIG. 3 is a block diagram illustrating an example computing device that is configured to download and install one or more patches, in accordance with one or more aspects of the present disclosure.

FIG. 3 is a block diagram illustrating an example computing device that is configured to download and install one or more patches, in accordance with one or more aspects of the present disclosure. FIG. 3 illustrates only one particular example of computing device 302, and many other examples of computing device 302 may be used in other instances and may include a subset of the components included in example computing device 302 or may include additional components not shown in FIG. 3. Computing device 302 may represent one example of computing device 102 shown in the example of FIG. 1.

As shown in the example of FIG. 3, computing device 302 includes user interface component (UIC) 344, one or more processors 336, one or more communication units 338, and one or more storage devices 328, each of which are interconnected by communication channels 330 (which may be similar to if not the same as communication channels 250 shown in the example of FIG. 2). UIC 314 may be similar to if not the same as UIC 144 shown in the example of FIG. 1. Processors 336 may be similar to if not the same as processors 240 shown in the example of FIG. 2. Communication units 338 may be similar to if not the same as communication units 242 shown in the example of FIG. 2. Storage devices 328 may be similar to if not the same as storage devices 248 shown in the example of FIG. 2, while communication channels As further shown in the example of FIG. 3, user interface component 344 may include one or more input components 332 and one or more output components 334. One or more input components 332 of computing device 302 may receive an input. Examples of inputs are tactile, audio, and video input. Input components 332, in one example, includes a presence-sensitive input device (e.g., a touch sensitive screen, a presence-sensitive display), mouse, keyboard, voice responsive system, video camera, microphone or any other type of device for detecting input from a human or machine. In some examples, input components 332 may include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 334 of computing device 302 may generate output. Examples of output are tactile, audio, and video output. Output components 334 of computing device 302, in one example, includes a PSD, sound card, video graphics adapter card, speaker, cathode ray tube (CRT) monitor, liquid crystal display (LCD), or any other type of device for generating output to a human or machine.

While illustrated as an internal component of computing device 302, UIC 344 may also represent an external component that shares a data path with computing device 302 for transmitting and/or receiving input and output. For instance, in one example, UIC 344 represents a built-in component of computing device 302 located within and physically connected to the external packaging of computing device 302 (e.g., a screen on a mobile phone). In another example, UIC 344 represents an external component of computing device 302 located outside and physically separated from the packaging or housing of computing device 302 (e.g., a monitor, a projector, etc. that shares a wired and/or wireless data path with computing device 302).

One or more storage devices 328 within computing device 302 may store information for processing during operation of computing device 302 (e.g., computing device 302 may store data accessed by UI module 146, application installer 148, unpatched applications 130A, and one or more segments 127 during execution by computing device 302). Storage devices 328 may store program instructions and/or information (e.g., data) associated with segmented patch application unit 136, UI module 146, application installer 148, application 130A, and segment 127A. Storage components 328 may include a memory configured to store data or other information associated with segmented patch application unit 136, UI module 146, application installer 148, application 130A, and segment 127A.

As discussed above, application installer 148 may be executed by processors 236 to install patches at computing device 302. Application installer 148 may perform the functions of an application marketplace application that allows users to interact with application store interface 260 via UIC 344 to browse, download, and install patches from an application provider server, such as application provider server 204 shown in the example of FIG. 2. UIC 344 may receive an indication indicative of a request to download a patch, such as patch 117, for unpatched application 130A, and UI module 146 may forward the request to application installer 148. Responsive to the indication of the request to download patch 117, application installer 148 may then send the request to application provider server 204.

In response to sending the request for patch 117 to application provider server 204, application installer 148 may receive patch 117 in the form of each individual segment of segments 127, from application provider server 204. Application installer 148 may receive segment 127A of patch 117 for application 130A in a compressed form in order to potentially reduce the amount of time required to download segment 127A and reduce the network resources used in the download. Each asset 142 (or portions thereof) within diff segments 123 of segment 127A may have been compressed (e.g., by application provider server 204) using a compression algorithm that is specific to the type of asset 142, to reduce the size of segment 127A that is transmitted via a network to computing device 302. Thus, when application segment 127A includes two or more of assets 142 of two or more different types, each of the two or more types of assets 142 may have been compressed using a different compression algorithm as discussed in detail above.

To decompress assets 142 represented as diff segments 123 of segment 127A, segmented patch application unit 136 may invoke decompression unit 366, which may store compression dictionaries for assets that have been compressed using a dictionary-based compression algorithm in which a block of data, such as a string, can be replaced by reference to the position of the block of data in the compression dictionaries. The compression dictionaries can include an index of blocks of data which the dictionary-based compression algorithm may index into so as to compress and decompress data. To decompress application elements that have been compressed using a dictionary-based compression algorithm, decompression unit 366 may substitute the references in the compressed assets with blocks of data at the corresponding referenced locations in the compression dictionaries.

Once computing device 302 has downloaded segment 127A, segmented patch application unit 136 may invoke virtualization unit 362. Virtualization unit 362 may represent a unit configured to virtualize unpatched application 130A in a similar if not substantially similar manner to that described above with respect to virtualization unit 262 of application provider server 204 as shown in the example of FIG. 2. Virtualization unit 362 may create a single virtual asset 134A that makes unpatched application 130A, including assets 132, appear as a single file.

Segmented patch application unit 136 may next extract commands 121 and begin application of diff segments 123 according to commands 121. For copy commands of commands 121, segmented patch application unit 136 may move one or more assets 132 (or portions thereof) from virtual asset 134A to virtual asset 134B, where such copied assets are now denoted as assets 142. For delete commands of commands 121, segmented patch application unit 136 may delete an identified one of assets 132. For write commands of commands 121, segmented patch application unit 136 may write one or more of diff segments 123 to virtual assets 134B, which are shown again as assets 142.

As discussed above, patch generation unit 116 may invoke compression unit 266 in order to compress diff segments 123. As such, in order to write diff segments 123, segmented patch application unit 136 may invoke decompression unit 366, which may decompress segment 127A and thereby decompress assets 142 referenced by commands 121 included within segment 127A. However, during extraction (which is another way to refer to decompression), rather than store both the compressed asset and a temporary copy of the asset, decompression unit 366 may directly extract the assets to the final location within the file system, thereby further conserving memory consumption. In order to facilitate directly writing to the underlying file system, patch generation unit 116 of application provider server 204 may write additional headers (which are referred to as local file headers—LFH) prior to each of the new assets (e.g., one or more of assets 142) stored in patch 117 indicating where each of the new assets are to be stored.

Decompression unit 366 may reference each of the local file headers, saving the local file headers to memory. Referencing the local file header, decompression unit 366 may extract diff segments 123 directly to the file system at the location specified in the local file headers. As such, decompression unit 366 may avoid maintaining a temporary copy of diff segments 123 in memory prior moving the copy of diff segments 123 into corresponding locations in the file system.

In any event, segmented patch application unit 136 may invoke decompression unit 366 for each diff segment 123 as each is referenced by commands 121, as the extraction will directly write each of the decompressed forms of diff segments 123 to virtual asset 134B (as one of assets 142). In this way, segmented patch application unit 136 may process segment 127A in a potentially more memory efficient manner. Segmented patch application unit 136 may repeat this process for each one of segments 127 until patch 127 is entirely installed.

In some examples, segmented patch application unit 136 may detect a system failure during the installation of a segment (e.g., segment 127A), and may resume the installation of the segment by periodically generating a checkpoint element. In the example of FIG. 3, checkpoint element 367 for segment 127A may be periodically generated and may be stored within storage components 228. Checkpoint element 367 may contain one or more of asset name, asset status, asset offset, remaining bytes for an asset that was being applied during installation of the segment 127A, and an indication of a next segment to be applied. Asset name indicates the asset was being applied at the time of the system failure.

Asset status indicates that the system failure happened during the asset installation process or happened during a local file header reading process for the asset. In one of the examples, a value of zero may indicate the system failure happened during the asset installation process and a value of one may indicate the system failure happened during the local file header reading process.

The asset offset indicates the location to start applying the next segment. The remaining bytes indicates the location to resume installation of the asset. The next segment element indicates the next segment for installation. In this way, using checkpoint element 367, segmented patch application unit 136 may resume installation of a segment when a system failure occurs.

In addition, segmented patch application unit 136 may also receive metadata 119 identifying when segmented patch application unit 136 may delete assets 132. That is, segmented patch application unit 136 may receive metadata 119 along with a first segment sent to computing device 302 (e.g., segment 127A), where metadata 119 may be appended, in some examples, to segment 127A. Responsive to receiving segment 127A, segmented patch application unit 136 may invoke a metadata processing unit 364. Metadata processing unit 364 may represent a unit configured to parse metadata 119 from segment 127A and then process metadata 119 to remove assets 132 during application of segments 127 (or, in other words, during application of patch 117).

Metadata processing unit 364 may then maintain read counter 139 in the same way as that described above with respect to patch generation unit 116. Whenever a read index in metadata 119 matches read counter 139, segmented patch application unit 136 may delete the one of assets 132 identified by the corresponding asset identifier (which may more generally refer to any portion of unpatched application 130A).

In some examples, a read index may have a negative value (such as negative one (−1)), which indicates that the corresponding one of assets 132 can be deleted without reference to read counter 139 (e.g., because it was deprecated, replaced, or otherwise removed entirely). In these examples, metadata processing unit 364 may initially process metadata 119 to proactively delete all of assets 132 identified by the application identifier with a corresponding read index having a negative value (e.g., asset 132A).

Segmented patch application unit 136 may continue in this manner to receive segments 127 iteratively and applying each of segments 127 individually prior to applying a successive one of segments 127. In some examples, segmented patch application unit 136 may interface with application provider server 204 to provide a confirmation that a previous one of segments 127 was successfully applied, and only after receiving the confirmation may application provider server 104 transmit a next one of segments 127 to potentially ensure that available memory resources are conserved such that application of patch 117 may complete successfully.

Likewise, metadata processing unit 364 may continue to maintain read counter 139 as segments 127 are iteratively applied to virtual asset 134A. Metadata processing unit 364 may continue to reference read counter 139 relative to instructions 129 of metadata 119, and whenever read counter 139 matches a read index of one of instructions 129, delete a corresponding one of assets 132.

FIG. 4 is a block diagram illustrating an example virtual asset generated by the system of FIG. 1 in accordance with various aspects of the techniques described in this disclosure. In the example of FIG. 4, virtual asset 418 may represent an example of any one of virtual assets 114A, 114B, 134A, and/or 134B Virtual asset 418 may include assets 416A-416N ("assets 416"), local file headers (LFH) 440A-440N ("LFH 440") that may indicate the corresponding locations in a memory to store an associated one of assets 416, and central directory 422 which defines the central directory for the underlying file system to which assets 416 are stored.

In order to generate virtual asset 418, system 100 (either or both of application provider server 104 and computing device 102) may invoke a modified RandomAccessFile function that can process multiple files across a file system hierarchy, moving between folders and sub-folders to identify each of assets 416 stored to central directory 422. As such, system 100 may create LFH 440 for each of assets 416, generating an LFH of LFH 440 for each of assets 416 that identify, relative to central directory 422, a location of asset 416, thereby allowing each of assets 416 to be extracted during decompression directly to the location at which each of assets 416 are to be stored (and thereby avoiding the temporary copy noted above with respect to the example of FIG. 3).

Figure 5A:
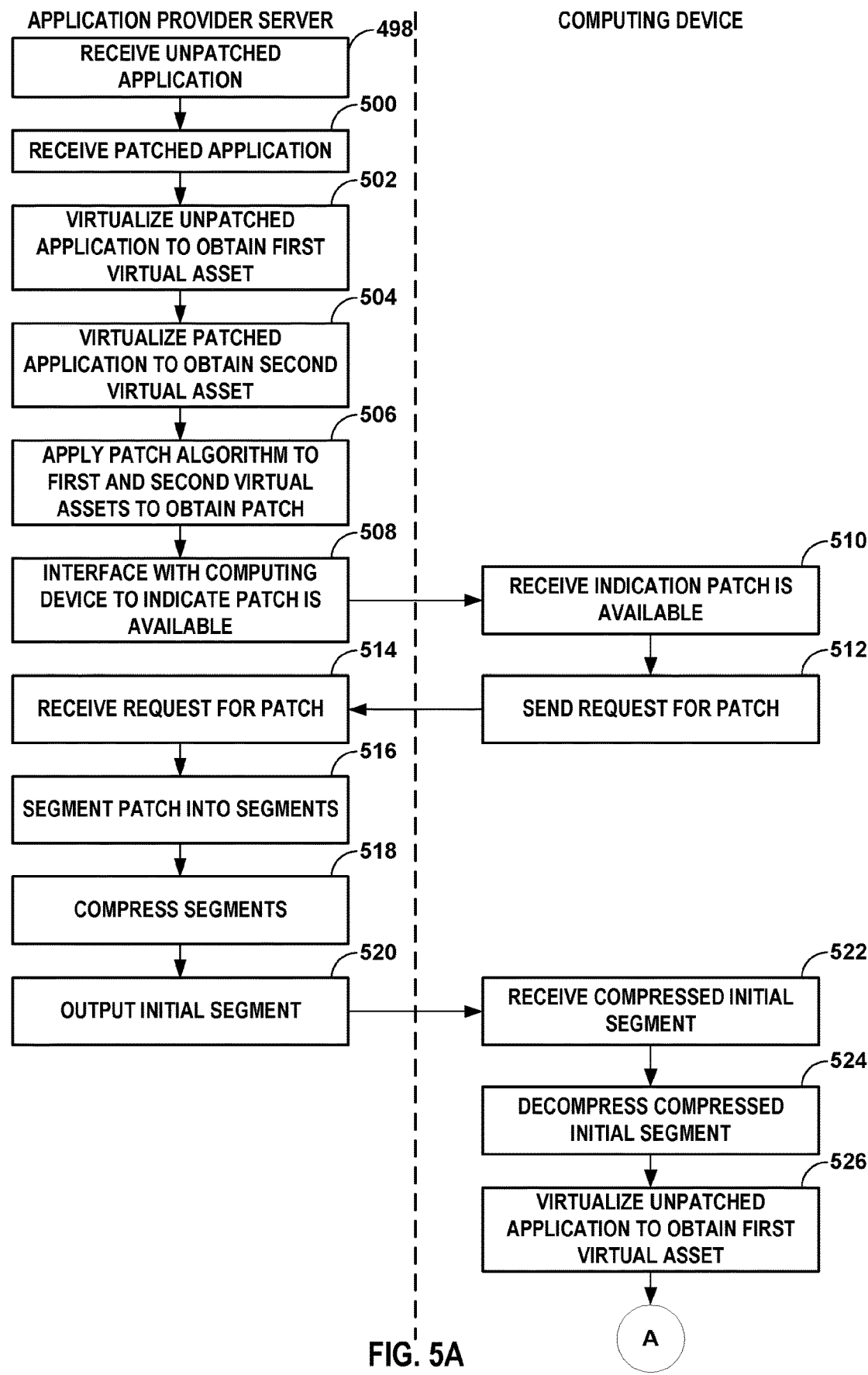
FIGS. 5A and 5B are a flowchart illustrating example operation of the application provider server shown in the example in FIG. 2 in providing the patch to the computing device shown in the example of FIG. 3 in accordance with the memory efficient patching techniques described in this disclosure.
Figure 5B:
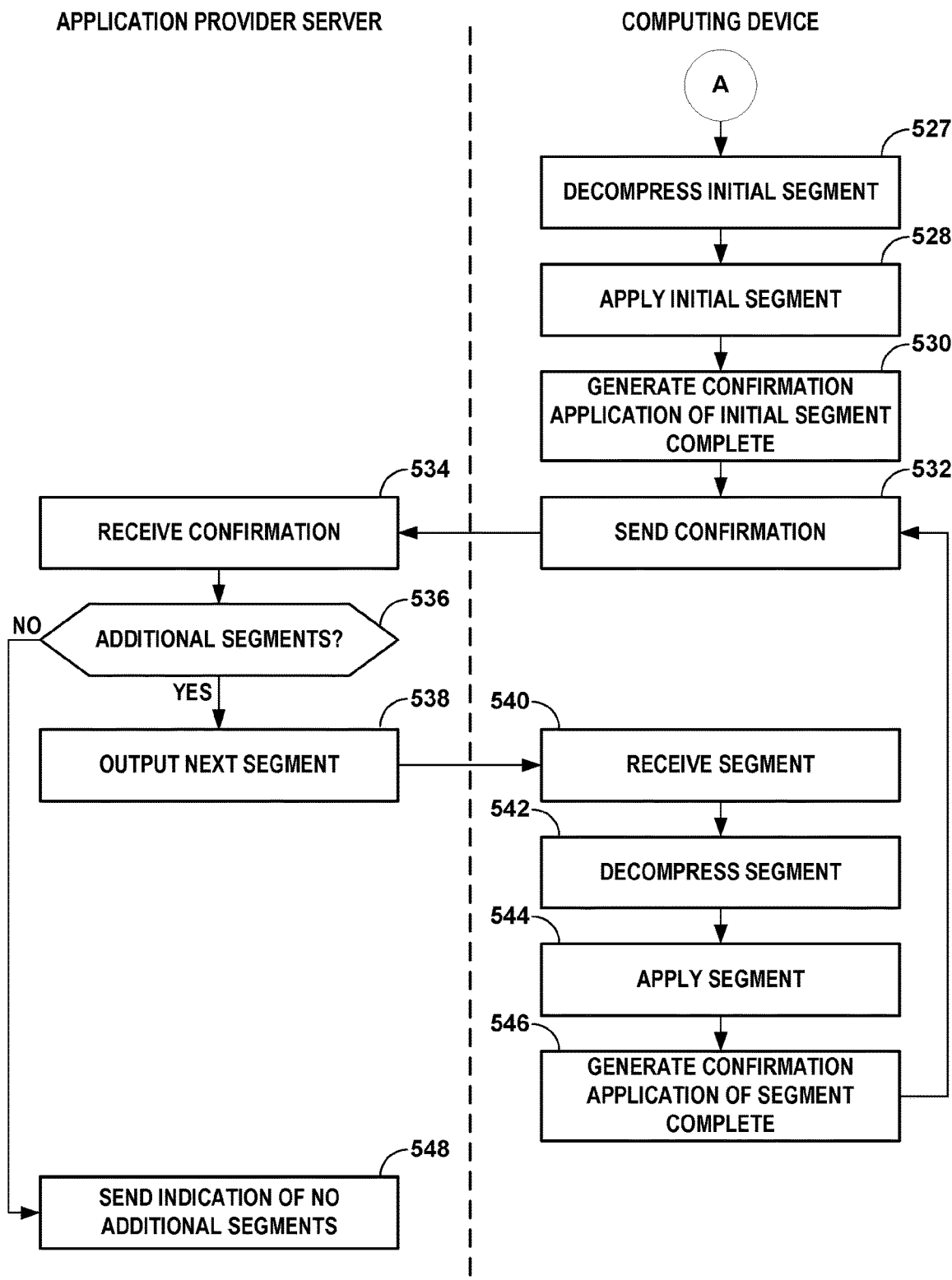

FIGS. 5A and 5B are a flowchart illustrating example operation of the application provider server shown in the example in FIG. 2 in providing the patch to the computing device shown in the example of FIG. 3 in accordance with the memory efficient patching techniques described in this disclosure. Application provider server 204 may initially receive, via application store interface 260, an unpatched application 110A (498) and subsequently receive a patched application 110B from a software developer responsible for supporting application 110A (500). Application provider server 204 may, responsive to receiving patched application 110B, invoke patch generation unit 116 to generate a patch 117 representative of a difference between unpatched application 110A and patched application 110B. In this respect, patch generation unit 116 may generate patch 117 based on unpatched application 110A and patched application 110B.

To generate patch 117, patch generation unit 116 may first invoke virtualization unit 262. Virtualization unit 262 may virtualize a number of assets, such as each of assets 112 and 122, that form an application, such as respective unpatched application 110A and patched application 110B. Virtualization unit 262 may append a number of different assets to one another and encapsulate the appended assets as a single object having extended functions to handle how the appended assets are accessed and stored to the underlying filesystem. Virtualization unit 262 may, in this way, virtualize unpatched application 110A to obtain first virtual asset 114A (502) and patched application 110B to obtain second virtual asset 114B (504).

Next, patch generation unit 116 may apply one or more of the above noted patching algorithms with respect to virtual asset 114A and virtual asset 114B to obtain commands 121 and diff 123 that may collectively represent patch 117 (506). After generating patch 117, application provider server 204 may invoke application store interface 260 to interface with computing device 102, via communication units 242, to indicate that patch 117 is available for download (508). UIC 344 of computing device 302 may receive an indication indicative of a request to download a patch, such as patch 117, for unpatched application 130A (510), and UI module 146 may forward the request to application installer 148. Responsive to the indication of the request to download patch 117, application installer 148 may send the request for patch 117 to application provider server 204 (512).

Application provider server 204 may thereafter receive a request for patch 117 (514) and possibly, via this request or a separate communication, device information 267. Device information 267 may include one or more types of information about computing device 102, but may also specify an amount of memory that is available (which may be referred to as "available memory"). Application provider server 204 may next invoke patch segmentation unit 118, passing device information 267 to patch segmentation unit 118.

Patch segmentation unit 118 may segment patch 117 into segments 127 (516), possibly based on device information 267. That is, should device information 267 indicate that available memory is below a threshold, patch segmentation unit 118 may select a smaller size for each of segments 127 than would otherwise be selected (or pre-defined) when device information 267 indicates that available memory is above the threshold. In some instances however, patch segmentation unit 118 may segment patch 117 into segments 127 regardless of device information 267, where the size of each of segments 127 may be the same, pre-defined for each segment but not necessarily the same, or adapted based on various criteria (such as ability to be individually installed).

Patch segmentation unit 118 may, upon generating segments 127, invoke compression unit 266 to compress each of segments 127 independent from one another (such that each of segments 127 may be individually decompressed) (518). Application provider server 204 may then iteratively output (possibly one at a time) segments 127 to computing device 102 (where one segment may include metadata 119), which patch generation unit 116 may pass to patch segmentation unit 118 along with patch 117. Application provider server 204 may output an initial segment of segments 127 (520).

Application installer 148 may receive initial segment 127A of patch 117 for application 130A in a compressed form in order to potentially reduce the amount of time required to download segment 127A and reduce the network resources used in the download. As such, application installer 148 may received a compressed initial segment 127A (522). To decompress assets 142, represented as diff segments 123 of segment 127A, segmented patch application unit 136 may invoke decompression unit 366, which may decompress segment 127A (524).

Virtualization unit 362 may next virtualize unpatched application 130A in a similar if not substantially similar manner to that described above with respect to virtualization unit 262 of application provider server 204 as shown in the example of FIG. 2 (526). Virtualization unit 362 may create a single virtual asset 134A that makes unpatched application 130A, including assets 132, appear as a single file.

Segmented patch application unit 136 may next extract commands 121 and begin application of diff segments 123 according to commands 121. Segmented patch application unit 136 may invoke decompression unit 366 for each diff segment 123 as each is referenced by commands 121, as the extraction will directly write each of the decompressed forms of diff segments 123 to virtual asset 134B (as one of assets 142). In this way, segmented patch application unit 136 may process segment 127A in a potentially more memory efficient manner. In this way, segmented patch application unit 136 may decompress initial segment 127A (527) and apply initial segment 127 to the first virtual asset to obtain the second virtual asset (528).

Segmented patch application unit 136 may, upon successful application of initial segment 127A, generate a confirmation that application of initial segment 127A is complete and send the confirmation to application provider server 204 (530, 532). Application provider server 204 may receive the confirmation (534) and determine whether there are additional segments 127 to send (536). When there are addition segments 127 to send, application provider server 204 outputs the next segment of segments 127 (538), which computing device 302 may receive, decompress, and apply as described above (540-544). Computing device 302 may generate another confirmation that application of the received segment is complete, outputting the confirmation as described above (546, 532).

This process may continue until application provider server 204 determines that there are no additional segments (532-546). When no additional segments are left to send to computing device 302 ("NO" 536), application provider server 204 may send an indication that there are no additional segments (or, in other words, that the entire patch has been provided and applied) (548).

Figure 6:
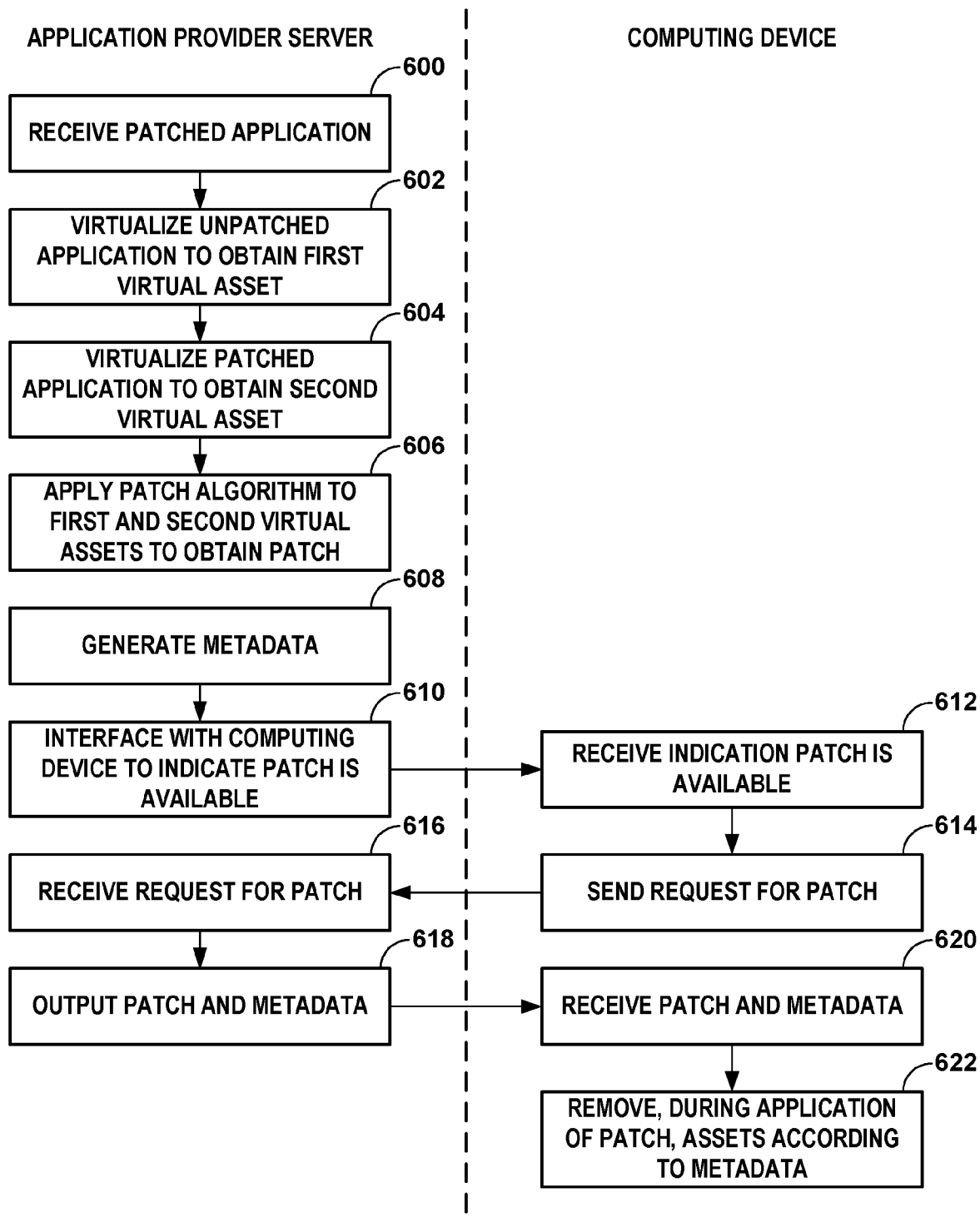
FIG. 6 is another flowchart illustrating example operation of the application provider server shown in the example in FIG. 2 in providing the patch to the computing device shown in the example of FIG. 3 in accordance with the memory efficient patching techniques described in this disclosure.

FIG. 6 is another flowchart illustrating example operation of the application provider server shown in the example in FIG. 2 in providing the patch to the computing device shown in the example of FIG. 3 in accordance with the memory efficient patching techniques described in this disclosure. As described above, application provider server 204 may initially receive, via application store interface 260, patched application 110B from a software developer responsible for supporting application 110A (600). Application provider server 204 may, responsive to receiving patched application 110B, invoke patch generation unit 116 to generate a patch 117 representative of a difference between unpatched application 110A and patched application 110B. In this respect, patch generation unit 116 may generate patch 117 based on unpatched application 110A and patched application 110B.

To generate patch 117, patch generation unit 116 may first invoke virtualization unit 262. Virtualization unit 262 may virtualize a number of assets, such as each of assets 112 and 122, that form an application, such as respective unpatched application 110A and patched application 110B. Virtualization unit 262 may append a number of different assets to one another and encapsulate the appended assets as a single object having extended functions to handle how the appended assets are accessed and stored to the underlying filesystem. Virtualization unit 262 may, in this way, virtualize unpatched application 110A to obtain first virtual asset 114A (602) and patched application 110B to obtain second virtual asset 114B (604).

Next, patch generation unit 116 may apply one or more of the above noted patching algorithms with respect to virtual asset 114A and virtual asset 114B to obtain commands 121 and diff 123 that may collectively represent patch 117 (606). During application of the patching algorithm, patch generation unit 116 may invoke metadata generation unit 264, which may represent a unit configured to generate metadata 119 that indicates when assets 112 of unpatched application 110A may be deleted during application of patch 117 to other instances of unpatched application (such as unpatched application 130A of computing device 102 shown in the example of FIG. 1) (608).

After generating patch 117, application provider server 204 may invoke application store interface 260 to interface with computing device 102, via communication units 242, to indicate that patch 117 is available for download (610). UIC 344 of computing device 302 may receive an indication indicative of a request to download a patch, such as patch 117, for unpatched application 130A (612), and UI module 146 may forward the request to application installer 148. Responsive to the indication of the request to download patch 117, application installer 148 may then send the request for patch 117 to application provider server 204 (614).

Application provider server 204 may thereafter receive a request for patch 117 (616) and output patch 117 (possible as one or more segments 127 as discussed above) along with metadata 119 (618). Segmented patch application unit 136 may receive patch 117 and metadata 119 (620), where metadata 119 may identify when segmented patch application unit 136 may delete assets 132. In some examples, segmented patch application unit 136 may receive metadata 119 along with a first segment sent to computing device 302 (e.g., segment 127A), where metadata 119 may be appended, in some examples, to segment 127A. Responsive to receiving segment 127A, segmented patch application unit 136 may invoke a metadata processing unit 364. Metadata processing unit 364 may parse metadata 119 from segment 127A and then process metadata 119 to remove assets 132 during application of segments 127 (or, in other words, during application of patch 117) (622).

Segmented patch application unit 136 may continue in this manner to receive segments 127 iteratively and applying each of segments 127 individually prior to applying a successive one of segments 127. In some examples, segmented patch application unit 136 may interface with application provider server 204 to provide a confirmation that a previous one of segments 127 was successfully applied, and only after receiving the confirmation may application provider server 104 transmit a next one of segments 127 to potentially ensure that available memory resources are conserved such that application of patch 117 may complete successfully.

Various aspects of the techniques may enable various examples set forth below with respect to the following clauses.

Clause 1A. A method comprising: virtualizing, by one or more processors, a first plurality of assets that form an unpatched application to obtain a single first virtual asset; obtaining, by the one or more processors, a single second virtual asset that represents a second plurality of assets that form a patched application; obtaining, by the one or more processors, and based on differences between the single first virtual asset and the single second virtual asset, a patch identifying how to update the first virtual asset to obtain the single second virtual asset and including portions of the second virtual asset used to update the single first virtual asset; segmenting, by the one or more processors, the patch into a plurality of segments; and outputting, by the one or more processors, and to a user computing device, a single segment from the plurality of segments for individual installation by a user computing device to the unpatched application.

Clause 2A. The method of clause 1A, wherein the single segment includes a copy command, and a write command indicating how to update the first virtual asset to obtain the single second virtual asset.

Clause 3A. The method of any combination of clauses 1A and 2A, further comprising: generating metadata indicating when to delete portions of the single first virtual asset; and outputting, to the user computing device, the metadata.

Clause 4A. The method of clause 3A, wherein the metadata includes a read index indicating after which cumulative memory read, during application of the plurality of segments, to delete a portion of the single first virtual asset.

Clause 5A. The method of clause 4A, wherein the read index includes a negative value indicating deletion of the portions of the single first virtual asset.

Clause 6A. The method of any combination of clauses 3A-5A, wherein the portions of the single first virtual asset include an asset of the first plurality of assets.

Clause 7A. The method of any combination of clauses 1A-5A, further comprising compressing the each of the segments to obtain compressed segments.

Clause 8A. The method of any combination of clauses 1A-6A, wherein outputting the single segment includes outputting the single segment only after receiving confirmation from the user computing device that a previously sent segment from the plurality of segments has been installed.

Clause 9A. The method of any combination of clauses 1A-8A, wherein segmenting the patch into a plurality of segments comprises: obtaining device information describing an available memory size of the user computing device; and determining a size of each segment from the plurality of segments based on the available memory size of the user computing device.

Clause 10A. The method of any combination of clauses 1A-9A, wherein a size of at least two of the plurality of segments is the same.

Clause 11A. The method of any combination of clauses 1A-9A, wherein a size of each segment from the plurality of segments is pre-defined.

Clause 12A. The method of any combination of clauses 1A-11A, wherein the first plurality of assets and the second plurality of assets each comprise one or more of images, animations, textures, audio data, and video data.

Clause 13A. A server computing device comprising: a memory configured to store a first plurality of assets that form an unpatched application and a second plurality of assets that form a patched application; and one or more processors configured to: virtualize the first plurality of assets to obtain a single first virtual asset; obtain a single second virtual asset that represents a second plurality of assets that form a patched application; obtain, based on differences between the single first virtual asset and the single second virtual asset, a patch identifying how to update the first virtual asset to obtain the single second virtual asset and including portions of the second virtual asset used to update the single first virtual asset; segment the patch into a plurality of segments; and output, to the user computing device, a single segment from the plurality of segments for individual installation by a user computing device to the unpatched application.

Clause 14A. The server computing device of clause 13A, wherein the single segment includes a copy command, and a write command indicating how to update the first virtual asset to obtain the single second virtual asset.

Clause 15A. The server computing device of any combination of clauses 13A and 14A, wherein the one or more processors are further configured to: generating metadata indicating when to delete portions of the single first virtual asset; and outputting, to the user computing device, the metadata.

Clause 16A. The server computing device of clause 15A, wherein the metadata includes a read index indicating after which cumulative memory read, during application of the plurality of segments, to delete a portion of the single first virtual asset.

Clause 17A. The server computing device of clause 16A, wherein the read index includes a negative value indicating deletion of the portions of the single first virtual asset.

Clause 18A. The server computing device of any combination of clauses 15A-17A, wherein the portions of the single first virtual asset include an asset of the first plurality of assets.

Clause 19A. The server computing device of any combination of clauses 13A-17A, wherein the one or more processors are further configured to compress the each of the segments to obtain compressed segments.

Clause 20A. The server computing device of any combination of clauses 13A-18A, wherein the one or more processors are configured to output the single segment only after receiving confirmation from the user computing device that a previously sent segment from the plurality of segments has been installed.

Clause 21A. The server computing device of any combination of clauses 13A-20A, wherein the one or more processors are configured to: obtain device information describing an available memory size of the user computing device; and determine a size of each segment from the plurality of segments based on the available memory size of the user computing device.

Clause 22A. The server computing device of any combination of clauses 13A-21A, wherein a size of at least two of the plurality of segments is the same.

Clause 23A. The server computing device of any combination of clauses 13A-21A, wherein a size of each segment from the plurality of segments is pre-defined.

Clause 24A. The server computing device of any combination of clauses 13A-23A, wherein the first plurality of assets and the second plurality of assets each comprise one or more of images, animations, textures, audio data, and video data.

Clause 25A. A non-transitory computer-readable storage medium having stored thereon instructions that, when executed, cause one or more processors to: virtualize a first plurality of assets that form an unpatched application to obtain a single first virtual asset; obtain a single second virtual asset that represents a second plurality of assets that form a patched application; obtain, based on differences between the single first virtual asset and the single second virtual asset, a patch identifying how to update the first virtual asset to obtain the single second virtual asset and portions of the second virtual asset used to update the single first virtual asset; segment the patch into a plurality of segments; and output, to the user computing device, a single segment from the plurality of segments for individual installation by a user computing device to the unpatched application.

Clause 1B. A method comprising: obtaining, by one or more processors of a user computing device, and from a server computing device, a single segment of a plurality of segments, the plurality of segments representative of a patch identifying how to update a first virtualized asset representative of an unpatched application to obtain a single second virtualized asset representative of a patched application and including portions of the second virtualized asset used to update the single first virtualized asset; virtualizing, by the one or more processors, a first plurality of assets that form the unpatched application installed at the user computing device to obtain the single first virtual asset; and applying, by the one or more processors, the single segment to the single first virtual asset to construct at least a portion of a single second virtual asset, the single second virtual asset including a second plurality of assets that form a patched application.

Clause 2B. The method of clause 1B, wherein the single segment includes one or more of a delete command, a copy command, and a write command indicating how to update the first virtual asset to obtain the single second virtual asset.

Clause 3B. The method of any combination of clauses 1B and 2B, further comprising: obtaining metadata indicating when to delete portions of the single first virtual asset; and deleting, based on the metadata, portions of the single first virtual asset.

Clause 4B. The method of clause 3B, wherein the metadata includes a read index indicating after which cumulative memory read, during application of the plurality of segments, to delete a portion of the single first virtual asset, wherein the method further comprises: maintaining a read counter that reflects a number of reads of the single first virtual asset during application of the plurality of segments; and deleting, when the read counter equals the read index, the portion of the single first virtual asset.

Clause 5B. The method of clause 4B, wherein the read index includes a negative value indicating deletion of the portions of the single first virtual asset without referencing the read counter.

Clause 6B. The method of any combination of clauses 3B-5B, wherein the portions of the single first virtual asset include an asset of the first plurality of assets.

Clause 7B. The method of any combination of clauses 1B-5B, wherein the patch includes a compressed patch, and wherein the method comprises decompressing the single segment to write one of the portions of the second virtual asset directly to the patched application.

Clause 8B. The method of any combination of clauses 1B-6B, further comprising outputting, to the server computing device, a confirmation that a previously sent segment from the plurality of segments has been installed, wherein obtaining the single segment comprises receiving, responsive to outputting the confirmation, the single segment.

Clause 9B. The method of any combination of clauses 1B-8B, further comprising deleting, after applying the single segment to the single first virtual asset, the single segment before receiving a successive single segment of the plurality of segments.

Clause 10B. The method of any combination of clauses 1B-9B, further comprising: determining that a portion of the portions of the single second virtual asset is not fully provided in the single segment; caching, responsive to the determination that the portion is not fully provided in the single segment, the single segment; requesting, from the server computing device, a successive segment of the plurality of segments; receiving, responsive to the request for the successive segment, the successive segment; and applying the single segment and the successive segment to the single first virtual asset to construct at least the portion of the single second virtual asset.

Clause 11B. The method of any combination of clauses 1B-10B, further comprising: obtaining device information describing an available memory size of the user computing device; and outputting, to the server computing device, the device information to enable the server computing device to determine a size of each segment from the plurality of segments.

Clause 12B. The method of any combination of clauses 1B-10B, wherein a size of at least two of the plurality of segments is the same.

Clause 13B. The method of any combination of clauses 1B-10B, wherein a size of each segment from the plurality of segments is pre-defined.

Clause 14B. The method of any combination of clauses 1B-13B, wherein the first plurality of assets and the second plurality of assets each comprise one or more of images, animations, textures, audio data, and video data.

Clause 15B. A user computing device comprising: a memory configured to store a single segment of a plurality of segments provided by a server computing device, the plurality of segments representative of a patch identifying how to update a single first virtual asset representative of an unpatched application to obtain a single second virtual asset representative of a patched application and including portions of the second virtualized asset used to update the single first virtualized asset; and one or more processors configured to: virtualize a first plurality of assets that form the unpatched application installed at the user computing device to obtain the single first virtual asset; and apply the single segment to the single first virtual asset to construct at least a portion of a single second virtual asset, the single second virtual asset including a second plurality of assets that form a patched application.

Clause 16B. The user computing device of clause 15B, wherein the single segment includes one or more of a delete command, a copy command, and a write command indicating how to update the first virtual asset to obtain the single second virtual asset.

Clause 17B. The user computing device of any combination of clauses 15B and 16B, wherein the one or more processors are further configured to: obtain metadata indicating when to delete portions of the single first virtual asset; and delete, based on the metadata, portions of the single first virtual asset.

Clause 18B. The user computing device of clause 17B, wherein the metadata includes a read index indicating after which cumulative memory read, during application of the plurality of segments, to delete a portion of the single first virtual asset, and wherein the one or more processors are further configured to: maintain a read counter that reflects a number of reads of the single first virtual asset during application of the plurality of segments; and delete, when the read counter equals the read index, the portion of the single first virtual asset.

Clause 19B. The user computing device of clause 18B, wherein the read index includes a negative value indicating deletion of the portions of the single first virtual asset without referencing the read counter.

Clause 20B. The user computing device of any combination of clauses 17B-19B, wherein the portions of the single first virtual asset include an asset of the first plurality of assets.

Clause 21B. The user computing device of any combination of clauses 15B-19B, wherein the single segment includes a single compressed segment, and wherein the one or more processors are further configured to decompress the single compressed segment to write one of the portions of the second virtual asset directly to the patched application.

Clause 22B. The user computing device of any combination of clauses 15B-20B, wherein the one or more processors are further configured to output, to the server computing device, a confirmation that a previously sent segment from the plurality of segments has been installed, and wherein the one or more processors are configured to receive, responsive to outputting the confirmation, the single segment.

Clause 23B. The user computing device of any combination of clauses 15B-22B, wherein the one or more processors are further configured to deleting, after applying the single segment to the single first virtual asset, the single segment before receiving a successive single segment of the plurality of segments.

Clause 24B. The user computing device of any combination of clauses 15B-23B, wherein the one or more processors are further configured to: determining that a portion of the portions of the single second virtual asset is not fully provided in the single segment; caching, responsive to the determination that the portion is not fully provided in the single segment, the single segment; requesting, from the server computing device, a successive segment of the plurality of segments; receiving, responsive to the request for the successive segment, the successive segment; and applying the single segment and the successive segment to the single first virtual asset to construct at least the portion of the single second virtual asset.

Clause 25B. The user computing device of any combination of clauses 15B-24B, wherein the one or more processors are further configured to: obtaining device information describing an available memory size of the user computing device; and outputting, to the server computing device, the device information to enable the server computing device to determine a size of each segment from the plurality of segments.

Clause 26B. The user computing device of any combination of clauses 15B-24B, wherein a size of at least two of the plurality of segments is the same.

Clause 27B. The user computing device of any combination of clauses 15B-24B, wherein a size of each segment from the plurality of segments is pre-defined.

Clause 28B. The user computing device of any combination of clauses 15B-27B, wherein the first plurality of assets and the second plurality of assets each comprise one or more of images, animations, textures, audio data, and video data.

Clause 29B. A non-transitory computer-readable storage medium having stored thereon instructions that, when executed, cause one or more processors of a user computing device to: obtain, from a server computing device, a single segment of a plurality of segments, the plurality of segments representative of a patch identifying how to update a first virtualized asset representative of an unpatched application to obtain a single second virtualized asset representative of a patched application and including portions of the second virtualized asset used to update the single first virtualized asset; virtualize a first plurality of assets that form the unpatched application installed at the user computing device to obtain the single first virtual asset; and apply the single segment to the single first virtual asset to construct at least a portion of a single second virtual asset, the single second virtual asset including a second plurality of assets that form a patched application.

Clause 1C. A method comprising: virtualizing, by one or more processors, a first plurality of assets that form an unpatched application to obtain a single first virtual asset; virtualizing, by the one or more processors, a second plurality of assets that form a patched application to obtain a single second virtual asset; obtaining, by the one or more processors, and based on differences between the single first virtual asset and the single second virtual asset, a patch identifying how to update the first virtual asset to obtain the single second virtual asset and including portions of the second virtual asset used to update the single first virtual asset; generating, by the one or more processors, and while obtaining the patch, metadata indicating when a user computing device is able to delete portions of the single first virtual asset; and outputting, by the one or more processors, and to the user computing device, the patch and the metadata.

Clause 2C. The method of clause 1C, wherein the metadata includes a read index indicating after which cumulative memory read, during application of the patch, to delete a portion of the single first virtual asset stored by the user computing device.

Clause 3C. The method of clause 2C, wherein the read index includes a negative value indicating deletion of the portions of the single first virtual asset stored by the user computing device.

Clause 4C. The method of any combination of clauses 2C and 3C, wherein the portions of the single first virtual asset include an asset of the first plurality of assets.

Clause 5C. The method of any combination of clauses 1C-4C, further comprising compressing the patch to obtain a compressed patch.

Clause 6C. The method of any combination of clauses 1C-5C, wherein the patch includes one or more of a delete command, a copy command, and a write command indicating how to update the first virtual asset to obtain the single second virtual asset.

Clause 7C. The method of any combination of clauses 1C-6C, further comprising segmenting the patch into a plurality of segments, wherein outputting the patch comprises outputting, to the user computing device, a single segment from the plurality of segments for individual installation by the user computing device to the unpatched application.

Clause 8C. The method of clause 7C, wherein outputting the single segment includes outputting the single segment only after receiving confirmation from the user computing device that a previously sent segment from the plurality of segments has been installed.

Clause 9C. The method of any combination of clauses 7C and 8C, wherein segmenting the patch into a plurality of segments comprises: obtaining device information describing an available memory size of the user computing device; and determining a size of each segment from the plurality of segments based on the available memory size of the user computing device.

Clause 10C. The method of any combination of clauses 6C-9C, wherein a size of at least two of the plurality of segments is the same.

Clause 11C. The method of any combination of clauses 6C-9C, wherein a size of each segment from the plurality of segments is pre-defined.

Clause 12C. The method of any combination of clauses 1C-11C, wherein the first plurality of assets and the second plurality of assets each comprise one or more of images, animations, textures, audio data, and video data.

Clause 13C. A server computing device comprising: a memory configured to store a first plurality of assets that form an unpatched application and a second plurality of assets that form a patched application; and one or more processors configured to: virtualize the first plurality of assets to obtain a single first virtual asset; virtualize the second plurality of assets to obtain a single second virtual asset; obtain, based on differences between the single first virtual asset and the single second virtual asset, a patch identifying how to update the first virtual asset to obtain the single second virtual asset and including portions of the second virtual asset used to update the single first virtual asset; generate, while obtaining the patch, metadata indicating when a user computing device is able to delete portions of the single first virtual asset; and output, to the user computing device, the patch and the metadata.

Clause 14C. The server computing device of clause 13C, wherein the metadata includes a read index indicating after which cumulative memory read, during application of the patch, to delete a portion of the single first virtual asset stored by the user computing device.

Clause 15C. The server computing device of clause 14C, wherein the read index includes a negative value indicating deletion of the portions of the single first virtual asset stored by the user computing device.

Clause 16C. The server computing device of any combination of clauses 14C and 15C, wherein the portions of the single first virtual asset include an asset of the first plurality of assets.

Clause 17C. The server computing device of any combination of clauses 13C-16C, wherein the one or more processors are further configured to compress the patch to obtain a compressed patch.

Clause 18C. The server computing device of any combination of clauses 13C-17C, wherein the patch includes one or more of a delete command, a copy command, and a write command indicating how to update the first virtual asset to obtain the single second virtual asset.

Clause 19C. The server computing device of any combination of clauses 13C-18C, wherein the one or more processors are further configured to segmenting the patch into a plurality of segments, and wherein the one or more processors are configured to output, to the user computing device, a single segment from the plurality of segments for individual installation by the user computing device to the unpatched application.

Clause 20C. The server computing device of clause 19C, wherein the one or more processors are configured to output the single segment only after receiving confirmation from the user computing device that a previously sent segment from the plurality of segments has been installed.

Clause 21C. The server computing device of any combination of clauses 19C and 20C, wherein the one or more processors are configured to: obtain device information describing an available memory size of the user computing device; and determine a size of each segment from the plurality of segments based on the available memory size of the user computing device.

Clause 22C. The server computing device of any combination of clauses 18C-21C, wherein a size of at least two of the plurality of segments is the same.

Clause 23C. The server computing device of any combination of clauses 18C-21C, wherein a size of each segment from the plurality of segments is pre-defined.

Clause 24C. The server computing device of any combination of clauses 13C-23C, wherein the first plurality of assets and the second plurality of assets each comprise one or more of images, animations, textures, audio data, and video data.

Clause 25C. A non-transitory computer-readable storage medium having stored thereon instructions that, when executed, cause one or more processors to: virtualize a first plurality of assets that form an unpatched application to obtain a single first virtual asset; virtualize a plurality of assets that form a patched application to obtain a single second virtual asset; obtain, based on differences between the single first virtual asset and the single second virtual asset, a patch identifying how to update the first virtual asset to obtain the single second virtual asset and portions of the second virtual asset used to update the single first virtual asset; generate, while obtaining the patch, metadata indicating when a user computing device is able to delete portions of the single first virtual asset; and output, to the user computing device, the patch and the metadata.

Clause 1D. A method comprising: obtaining, by one or more processors of a user computing device, and from a server computing device, a patch identifying how to update a first virtualized asset representative of an unpatched application to obtain a single second virtualized asset representative of a patched application and including portions of the second virtualized asset used to update the single first virtualized asset; obtaining, by the one or more processors, and from the server computing device, metadata indicating when the user computing device is able to delete a portion of the single first virtual asset; virtualizing, by the one or more processors, a first plurality of assets that form the unpatched application installed at the user computing device to obtain the single first virtual asset; and applying, by the one or more processors, the patch to the single first virtual asset to construct the single second virtual asset, the single second virtual asset including a second plurality of assets that form a patched application; and deleting, during application of the patch, and based on the metadata, the portion of the single first virtual asset.

Clause 2D. The method of clause 1D, wherein the patch includes one or more of a delete command, a copy command, and a write command indicating how to update the first virtual asset to obtain the single second virtual asset.

Clause 3D. The method of any combination of clauses 1D and 2D, wherein the metadata includes a read index indicating after which cumulative memory read, during application of the patch, to delete the portion of the single first virtual asset, and wherein deleting, during application of the patch, the portion of the single first virtual asset comprises: maintaining a read counter that reflects a number of reads of the single first virtual asset during application of the patch; and deleting, when the read counter equals the read index, the portion of the single first virtual asset.

Clause 4D. The method of clause 3D, wherein the read index includes a negative value indicating deletion of the portion of the single first virtual asset without referencing the read counter.

Clause 5D. The method of any combination of clauses 1D-4D, wherein the portion of the single first virtual asset includes an asset of the first plurality of assets.

Clause 6D. The method of any combination of clauses 1D-5D,
wherein the patch includes a compressed patch, and wherein the method comprises decompressing the patch to write one of the portions of the second virtual asset directly to the patched application.

Clause 7D. The method of any combination of clauses 1D-6D, wherein obtaining the patch comprises obtaining a single segment of a plurality of segments, the plurality of segments representative of the patch, and wherein applying the patch comprises applying the single segment to the single first virtual asset to construct at least the portion of the single second virtual asset.

Clause 8D. The method of clause 7D, further comprising outputting, to the server computing device, a confirmation that a previously sent segment from the plurality of segments has been installed, wherein obtaining the single segment comprises receiving, responsive to outputting the confirmation, the single segment.

Clause 9D. The method of any combination of clauses 7D and 8D, further comprising deleting, after applying the single segment to the single first virtual asset, the single segment before receiving a successive single segment of the plurality of segments.

Clause 10D. The method of any combination of clauses 7D-9D, further comprising: determining that a portion of the portions of the single second virtual asset is not fully provided in the single segment; caching, responsive to the determination that the portion is not fully provided in the single segment, the single segment; requesting, from the server computing device, a successive segment of the plurality of segments; receiving, responsive to the request for the successive segment, the successive segment; and applying the single segment and the successive segment to the single first virtual asset to construct at least the portion of the single second virtual asset.

Clause 11D. The method of any combination of clauses 7D-10D, further comprising: obtaining device information describing an available memory size of the user computing device; and outputting, to the server computing device, the device information to enable the server computing device to determine a size of each segment from the plurality of segments.

Clause 12D. The method of any combination of clauses 7D-10D, wherein a size of at least two of the plurality of segments is the same.

Clause 13D. The method of any combination of clauses 7D-10D, wherein a size of each segment from the plurality of segments is pre-defined.

Clause 14D. The method of any combination of clauses 1D-13D, wherein the first plurality of assets and the second plurality of assets each comprise one or more of images, animations, textures, audio data, and video data.

Clause 15D. A user computing device comprising: a memory configured to store a patch identifying how to update a single first virtual asset representative of an unpatched application to obtain a single second virtual asset representative of a patched application and including portions of the second virtualized asset used to update the single first virtualized asset; and one or more processors configured to: apply the patch to the single first virtual asset to construct the single second virtual asset, the single second virtual asset including a second plurality of assets that form a patched application; and delete, during application of the patch, and based on the metadata, the portion of the single first virtual asset.

Clause 16D. The user computing device of clause 15D, wherein the patch includes one or more of a delete command, a copy command, and a write command indicating how to update the first virtual asset to obtain the single second virtual asset.

Clause 17D. The method of any combination of clauses 15D and 16D, wherein the metadata includes a read index indicating after which cumulative memory read, during application of the patch, to delete the portion of the single first virtual asset, wherein deleting, during application of the patch, the portion of the single first virtual asset comprises: maintaining a read counter that reflects a number of reads of the single first virtual asset during application of the patch; and deleting, when the read counter equals the read index, the portion of the single first virtual asset.

Clause 18D. The user computing device of clause 17D, wherein the read index includes a negative value indicating deletion of the portion of the single first virtual asset without referencing the read counter.

Clause 19D. The user computing device of any combination of clauses 15D-18D, wherein the portion of the single first virtual asset includes an asset of the first plurality of assets.

Clause 20D. The user computing device of any combination of clauses 15D-19D, wherein the single segment includes a single compressed segment, and wherein the one or more processors are configured to decompress the single compressed patch to write one of the portions of the second virtual asset directly to the patched application.

Clause 21D. The user computing device of any combination of claims 15D-20D, wherein the one or more processors are configured to obtain a single segment of a plurality of segments, the plurality of segments representative of the patch, and wherein the one or more processors are configured to apply the single segment to the single first virtual asset to construct at least the portion of the single second virtual asset.

Clause 22D. The user computing device of clause 21D, wherein the one or more processors are further configured to output, to the server computing device, a confirmation that a previously sent segment from the plurality of segments has been installed, and wherein obtaining the single segment comprises receiving, responsive to outputting the confirmation, the single segment.

Clause 23D. The user computing device of any combination of clauses 21D and 22D, wherein the one or more processors are further configured to delete, after applying the single segment to the single first virtual asset, the single segment before receiving a successive single segment of the plurality of segments.

Clause 24D. The user computing device of any combination of clauses 21D-23D, wherein the one or more processors are further configured to: determine that a portion of the portions of the single second virtual asset is not fully provided in the single segment;
  cache, responsive to the determination that the portion is not fully provided in the single segment, the single segment; request, from the server computing device, a successive segment of the plurality of segments; receive, responsive to the request for the successive segment, the successive segment; and apply the single segment and the successive segment to the single first virtual asset to construct at least the portion of the single second virtual asset.

Clause 25D. The user computing device of any combination of clauses 21D-24D, wherein the one or more processors are further configured to: obtain device information describing an available memory size of the user computing device; and output, to the server computing device, the device information to enable the server computing device to determine a size of each segment from the plurality of segments.

Clause 26D. The user computing device of any combination of clauses 21D-24D, wherein a size of at least two of the plurality of segments is the same.

Clause 27D. The user computing device of any combination of clauses 21D-24D, wherein a size of each segment from the plurality of segments is pre-defined.

Clause 28D. The user computing device of any combination of clauses 15D-27D, wherein the first plurality of assets and the second plurality of assets each comprise one or more of images, animations, textures, audio data, and video data.

Clause 29D. A non-transitory computer-readable storage medium having stored thereon instructions that, when executed, cause one or more processors of a user computing device to: obtain, from a server computing device, a patch identifying how to update a first virtualized asset representative of an unpatched application to obtain a single second virtualized asset representative of a patched application and including portions of the second virtualized asset used to update the single first virtualized asset; virtualize a first plurality of assets that form the unpatched application installed at the user computing device to obtain the single first virtual asset; and apply the patch to the single first virtual asset to construct the single second virtual asset, the single second virtual asset including a second plurality of assets that form a patched application; and delete, during application of the patch, and based on the metadata, the portion of the single first virtual asset.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
executing, by one or more processors, a virtualization algorithm that presents one or more of a first multi-tiered memory and a first storage file hierarchy having first folders and first subfolders in which an unpatched application, including a first plurality of assets, is stored as a single first virtual asset;
executing, by the one or more processors, the virtualization algorithm that presents one or more of a second multi-tiered memory and a second storage file hierarchy having second folders and second subfolders in which a patched application, including a second plurality of assets is stored as a single second virtual asset;
executing, by the one or more processors, a patching algorithm with respect to the single first virtual asset and the single second virtual asset to produce differences between the single first virtual asset and the single second virtual asset as a patch identifying how to update the single first virtual asset to obtain the single second virtual asset and including portions of the single second virtual asset used to update the single first virtual asset;
segmenting, by the one or more processors, the patch into a plurality of segments, wherein segmenting the patch into a plurality of segments comprises:
obtaining device information describing an available memory size of a user computing device;
selecting, based on the available memory size, a size for each of the plurality of segments; and
segmenting, based on the size, the patch into the plurality of segments;
generating metadata indicating when to delete portions of the single first virtual asset; and
outputting, by the one or more processors, and to the user computing device, the metadata and a single segment from the plurality of segments for individual application by the user computing device to the unpatched application.

2. The method of claim 1, wherein the single segment includes a copy command and a write command indicating how to update the first virtual asset to obtain the single second virtual asset.

3. The method of claim 1, wherein the metadata includes a read index indicating after which cumulative memory read, during the individual application of the single segment from the plurality of segments, to delete a portion of the single first virtual asset.

4. The method of claim 3, wherein the read index includes a negative value indicating deletion of the portions of the single first virtual asset.

5. The method of claim 1, wherein the portions of the single first virtual asset include an asset of the first plurality of assets.

6. The method of claim 1, further comprising compressing each of the plurality of segments to obtain a plurality of compressed segments.

7. The method of claim 1, wherein outputting the single segment includes outputting the single segment only after receiving confirmation from the user computing device that a previously sent segment from the plurality of segments has been installed.

8. The method of claim 1, wherein the size of at least two of the plurality of segments is the same.

9. The method of claim 1, wherein the size of each segment from the plurality of segments is pre-defined.

10. The method of claim 1, wherein the first plurality of assets and the second plurality of assets each comprise one or more images, animations, textures, audio data, or video data.

11. A server computing device comprising:
a memory configured to store a first plurality of assets that form an unpatched application and a second plurality of assets that form a patched application; and
one or more processors configured to:
execute a virtualization algorithm that presents one or more of a first multi-tiered memory and a first storage file hierarchy having first folders and first subfolders in which the unpatched application, including the first plurality of assets, is stored as a single first virtual asset;
execute the virtualization algorithm that presents one or more of a second multi-tiered memory and a second storage file hierarchy having second folders and second subfolders in which the patched application, including the second plurality of assets, is stored as a single second virtual asset;
execute a patching algorithm with respect to the single first virtual asset and the single second virtual asset to produce differences between the single first virtual asset and the single second virtual asset as a patch identifying how to update the single first virtual asset to obtain the single second virtual asset and portions of the single second virtual asset used to update the single first virtual asset;
obtain device information describing an available memory size of a user computing device;
select, based on the available memory size, a size for each of a plurality of segments of the patch;
segment, based on the size, the patch into the plurality of segments;
generate metadata indicating when to delete portions of the single first virtual asset; and
output, to the user computing device, the metadata and a single segment from the plurality of segments for individual application by the user computing device to the unpatched application.

12. The server computing device of claim 11, wherein the single segment includes a copy command and a write command indicating how to update the first virtual asset to obtain the single second virtual asset.

13. The server computing device of claim 11, wherein the metadata includes a read index indicating after which cumulative memory read, during the individual application of the single segment from the plurality of segments, to delete a portion of the single first virtual asset.

14. The server computing device of claim 13, wherein the read index includes a negative value indicating deletion of the portions of the single first virtual asset.

15. The server computing device of claim 11, wherein the portions of the single second virtual asset include an asset of the second plurality of assets.

16. The server computing device of claim 11, further comprising compressing each of the plurality of segments to obtain a plurality of compressed segments.

17. A non-transitory computer-readable storage medium having stored thereon instructions that, when executed, cause one or more processors to:
- execute a virtualization algorithm that presents one or more of a first multi-tiered memory and a first storage file hierarchy having first folders and first subfolders in which an unpatched application, including a first plurality of assets, is stored as a single first virtual asset;
- execute the virtualization algorithm that presents one or more of a second multi-tiered memory and a second storage file hierarchy having second folders and second subfolders in which a patched application, including a second plurality of assets, is stored as a single second virtual asset;
- execute a patching algorithm with respect to the single first virtual asset and the single second virtual asset to produce differences between the single first virtual asset and the single second virtual asset as a patch identifying how to update the single first virtual asset to obtain the single second virtual asset and portions of the single second virtual asset used to update the single first virtual asset;
- obtain device information describing an available memory size of a user computing device;
- select, based on the available memory size, a size for each of a plurality of segments of the patch;
- segment, based on the size, the patch into the plurality of segments;
- generate metadata indicating when to delete portions of the single first virtual asset; and
- output, to the user computing device, the metadata and a single segment from the plurality of segments for individual application by the user computing device to the unpatched application.

* * * * *